United States Patent
Kawai et al.

(10) Patent No.: US 10,378,932 B2
(45) Date of Patent: Aug. 13, 2019

(54) SENSOR HAVING GENERATING AND DETECTING UNITS ON A SUBSTRATE WITH A CURVE OR BENT SHAPE IN A CYLINDRICAL HOUSING AND METHOD OF MANUFACTURING SENSOR

(71) Applicant: NSK LTD., Tokyo (JP)

(72) Inventors: Yasuhiro Kawai, Kanagawa (JP); Toshiaki Oguchi, Kanagawa (JP); Hideki Furukawa, Kanagawa (JP); Tomoyuki Yanagisawa, Kanagawa (JP); Minoru Kubokawa, Kanagawa (JP)

(73) Assignee: NSK LTD., Tokyo (JP)

( * ) Notice: Subject to any disclaimer, the term of this patent is extended or adjusted under 35 U.S.C. 154(b) by 183 days.

(21) Appl. No.: 15/500,795

(22) PCT Filed: Aug. 5, 2015

(86) PCT No.: PCT/JP2015/072294
§ 371 (c)(1),
(2) Date: Jan. 31, 2017

(87) PCT Pub. No.: WO2016/021667
PCT Pub. Date: Feb. 11, 2016

(65) Prior Publication Data
US 2017/0219389 A1    Aug. 3, 2017

(30) Foreign Application Priority Data
Aug. 6, 2014    (JP) ................ 2014-160465

(51) Int. Cl.
*G01D 11/24* (2006.01)
*G01D 5/347* (2006.01)

(52) U.S. Cl.
CPC ....... *G01D 5/3473* (2013.01); *G01D 5/34707* (2013.01); *G01D 11/245* (2013.01)

(58) Field of Classification Search
CPC .. G01D 5/3473; G01D 5/345; G01D 5/24438; G01D 11/245; G01D 5/34707
See application file for complete search history.

(56) References Cited

U.S. PATENT DOCUMENTS

| | | | | | |
|---|---|---|---|---|---|
| 4,117,320 | A | * | 9/1978 | Tomlinson | G01D 5/36 250/231.16 |
| 4,606,133 | A | * | 8/1986 | Mills | G01C 9/12 33/346 |

(Continued)

FOREIGN PATENT DOCUMENTS

| | | |
|---|---|---|
| JP | 63-7310 U | 1/1988 |
| JP | 63-153425 A | 6/1988 |

(Continued)

OTHER PUBLICATIONS

Communication dated Jul. 3, 2018 from the Japanese Patent Office in counterpart application No. 2017051879.

(Continued)

*Primary Examiner* — Thanh Luu
*Assistant Examiner* — Jennifer D Bennett
(74) *Attorney, Agent, or Firm* — Sughrue Mion, PLLC

(57) ABSTRACT

A sensor including a generating unit; a detecting unit; a substrate; a member that exerts influence on an object to be detected; and a housing that includes a first housing that operably supports the member and a second housing to which a part of the substrate is fixed. The substrate includes a first portion provided with the generating unit and a second portion provided with the detecting unit that are integrated, and has a curved shape or a bent shape in which a surface of the first portion at which the generating unit is provided and a surface of the second portion at which the detecting (Continued)

unit is provided face each other. One of the first portion and the second portion is fixed to the second housing. A surface of the other of the first portion and the second portion adheres to the first housing.

6 Claims, 15 Drawing Sheets

(56) References Cited

U.S. PATENT DOCUMENTS

| | | | | |
|---|---|---|---|---|
| 4,661,698 A | * | 4/1987 | Cappio | G01D 5/34715 250/231.14 |
| 5,920,643 A | | 7/1999 | White et al. | |
| 2002/0018220 A1 | | 2/2002 | Aoki | |
| 2004/0173734 A1 | * | 9/2004 | Alsobrooks | B62D 15/022 250/231.13 |

FOREIGN PATENT DOCUMENTS

| | | | |
|---|---|---|---|
| JP | 63-185523 U | | 11/1988 |
| JP | 0380323 U | | 8/1991 |
| JP | 5-11472 U | | 2/1993 |
| JP | 0629375 U | | 4/1994 |
| JP | 08327402 A | | 12/1996 |
| JP | 09243411 A | | 9/1997 |
| JP | 11-317568 A | | 11/1999 |
| JP | 2000097957 A | | 4/2000 |
| JP | 2000180460 A | | 6/2000 |
| JP | 2001-27551 A | | 1/2001 |
| JP | 2001-141433 A | | 5/2001 |
| JP | 2001141433 A | * | 5/2001 |
| JP | 2005-210033 A | | 8/2005 |
| JP | 2009-121958 A | | 6/2009 |
| JP | 2009300240 A | | 12/2009 |
| JP | 2010230409 A | | 10/2010 |
| JP | 2013-231661 A | | 11/2013 |
| JP | 2013242304 A | | 12/2013 |
| WO | 2013/098935 A1 | | 7/2013 |

OTHER PUBLICATIONS

Communication dated Jul. 18, 2018 from the United States Patent and Trademark Office in counterpart U.S. Appl. No. 15/501,084.
JPO Office Action for Application No. 2014-160466 dated Oct. 20, 2015.
Decision to Grant a Patent for Japanese Application No. 2014-160466 dated May 17, 2016.
International Search Report for PCT/JP2015/072283 dated Oct. 27, 2015 [PCT/ISA/210].
Notification of Reasons for Refusal for application No. JP 2014-160467 dated Oct. 20, 2015.
Notification of Reasons for Refusal for application No. JP 2014-160467 dated May 17, 2016.
Notification of Reasons for Refusal for application No. JP 2014-160467 dated Aug. 2, 2016.
International Search Report for application No. PCT/JP2015/072276 dated Oct. 27, 2015.
Written Opinion for application No. PCT/JP2015/072276 dated Oct. 27, 2015.
Decision to Grant a Patent for Application No. 2014-160465 dated Jul. 26, 2016.
JPO Office Action for Application No. 2014-160465 dated May 12, 2016.
JPO Office Action for Application No. 2014-160465 dated Oct. 15, 2015.
International Search Report for PCT/JP2015/072294 dated Oct. 27, 2015 [PCT/ISA/210].
Office Action dated Dec. 11, 2018 from U.S. Patent & Trademark Office in counterpart U.S. Appl. No. 15/501,084.

* cited by examiner

SENSOR HAVING GENERATING AND DETECTING UNITS ON A SUBSTRATE WITH A CURVE OR BENT SHAPE IN A CYLINDRICAL HOUSING AND METHOD OF MANUFACTURING SENSOR

CROSS REFERENCE TO RELATED APPLICATIONS

This application is a National Stage of PCT international application Ser. No. PCT/JP2015/072294 filed on Aug. 5, 2015 which designates the United States, incorporated herein by reference, and which is based upon and claims the benefit of priority from Japanese Patent Application No. 2014-160465 filed on Aug. 6, 2014, the entire contents of which are incorporated herein by reference.

FIELD

The present invention relates to a sensor and a method of manufacturing a sensor.

BACKGROUND

As a configuration of a rotary encoder, a configuration in which a substrate provided with a light-emitting element that emits light and a substrate provided with a light-receiving element that detects the light emitted from the light-emitting element are housed in a housing of the rotary encoder is known (for example, Patent Literature 1).

CITATION LIST

Patent Literature

Patent Literature 1: Japanese Patent Application Laid-open No. 2001-027551

SUMMARY

Technical Problem

However, since the rotary encoder described in Patent Literature 1 has the light-emitting element and the light-receiving element that are on the separate substrates, there is a problem that the rotary encoder needs to perform positioning to determine a relation between a light-emitting range of the light emitted from the light-emitting element and a light-receiving range by the light-receiving element in assembly. Further, the rotary encoder described in Patent Literature 1 requires assembly to individually incorporate the substrate provided with the light-emitting element and the substrate provided with the light-receiving element into the housing after performing the positioning, and thus there is a problem of complexity of assembly.

The problems regarding the rotary encoder of the Patent Literature 1 are not limited to the rotary encoder for detection of light and are common to sensors in which a generating unit that emits an object to be detected (for example, light) and a detecting unit that detects the object to be detected generated by the generating unit are provided on separate substrates.

An objective of an aspect of the present invention is to provide a sensor and a method of manufacturing a sensor that further facilitate positioning of a generating unit and a detecting unit. Further, an objective of an aspect of the present invention is to provide a sensor and a method of manufacturing a sensor that further facilitates assembly.

Solution to Problem

To achieve the above objectives, a sensor according to an aspect of the present invention includes: a generating unit that generates a predetermined object to be detected; a detecting unit that detects the object to be detected generated by the generating unit; a substrate at which the generating unit and the detecting unit are provided; a member that exerts influence on the object to be detected by being operated in a region to be detected that is a space between the generating unit and the detecting unit; and a housing that houses the substrate and the member. The housing includes a first housing that operably supports the member and a second housing to which a part of the substrate is fixed. The substrate includes a first portion provided with the generating unit and a second portion provided with the detecting unit, the first portion and the second portion being integrated, and the substrate has a curved shape or a bent shape in which a surface of the first portion at which the generating unit is provided and a surface of the second portion at which the detecting unit is provided face each other. One of the first portion and the second portion is fixed to the second housing. A surface of the other of the first portion and the second portion adheres to the first housing, the surface of the other being opposite to another surface of the other facing the region to be detected.

Therefore, the first portion provided with the generating unit and the second portion provided with the detecting unit are not separated. Therefore, positioning of the generating unit and the detecting unit can be performed by determining the shape of the substrate. As described above, according to the sensor of the aspect of the present invention, the positioning of the generating unit and the detecting unit becomes easier. Further, one of the first portion and the second portion is fixed to the second housing, and the surface of the other that is opposite to the other surface of the other facing the region to be detected adheres to the first housing. That is, in assembly of the sensor, the one may just be fixed to the second housing, and the surface of the other that is opposite to the other surface of the other facing the region to be detected may just adhere to the first housing. Therefore, the assembly of the sensor becomes easier.

In the sensor of the aspect of the present invention, the surface of the other that is opposite to the other surface of the other facing the region to be detected may adhere to the first housing through a plate member.

Therefore, the surface of the other on the opposite side of the region to be detected can adhere to the first housing by simply providing the plate member. Therefore, the assembly of the sensor becomes easier.

In the sensor of the aspect of the present invention, one surface of the plate member may adhere to the surface of the other that is opposite to the other surface of the other facing the region to be detected, and the other surface of the plate member may adhere to the first housing.

Therefore, the other surface and the first housing can adhere in the state where the plate member and the substrate are integrated. Therefore, the assembly of the sensor becomes easier.

In the sensor of the aspect of the present invention, the surface of the other that is opposite to the other surface of the other facing the region to be detected may adhere to the first housing by an adhesive.

Therefore, the surface of the other on the opposite side of the region to be detected can adhere to the first housing by simply applying the adhesive to the first housing or the surface of the other of the first portion and the second portion on the opposite side of the region to be detected, and bringing the first housing and the other in contact. Therefore, the assembly of the sensor becomes easier.

The optical sensor according to the aspect of the present invention may be a rotary encoder.

Therefore, according to the aspect of the present invention, an angular position such as a rotary angle of a rotary moving body connected to the rotary encoder can be detected.

To achieve the above objectives, another aspect of the present invention is a method of manufacturing a sensor including a generating unit that generates a predetermined object to be detected, a detecting unit that detects the object to be detected generated by the generating unit, a substrate at which the generating unit and the detecting unit are provided, a member that exerts influence on the object to be detected by being operated in a region to be detected that is a space between the generating unit and the detecting unit, and a housing that houses the substrate and the member, and the method includes: forming the substrate that includes a first portion provided with the generating unit and a second portion provided with the detecting unit, the first portion and the second portion being integrated; causing one surface of a plate member to adhere to the first portion on one surface of the substrate; providing the generating unit at the first portion on the other surface of the substrate, and providing the detecting unit at the second portion on the other surface of the substrate; causing a shape of the substrate to become a curved shape or a bent shape in which the surface of the first portion at which the generating unit is provided and the surface of the second portion at which the detecting unit is provided face each other; forming the housing including a first housing that operably supports the member and a second housing to which a part of the substrate is fixed; and fixing the second portion to the second housing; and causing the other surface of the plate member to adhere to the first housing.

Therefore, the first portion provided with the generating unit and the second portion provided with the detecting unit are not separated, and thus positioning of the generating unit and the detecting unit can be performed by simple work such as bending or curving the substrate. As described above, according to the sensor of the other aspect of the present invention, the positioning of the generating unit and the detecting unit becomes easier. Further, in assembly of the sensor, the second portion may just be fixed to the second housing, and the plate member adhering to the first portion may just adhere to the first housing. Therefore, a process such as screwing becomes unnecessary, and the assembly of the sensor becomes easier.

Advantageous Effects of Invention

According to the sensor of the aspect of the present invention and the method of manufacturing a sensor of the other aspect of the present invention, positioning of the generating unit and the detecting unit can be further facilitated. Further, according to the sensor of the aspect of the present invention and the method of manufacturing a sensor of the other aspect of the present invention, assembly can be further facilitated.

DESCRIPTION OF EMBODIMENTS

Forms for implementing the present invention (embodiments) will be described in detail with reference to the drawings. The present invention is not limited by the content described in the embodiments below. Further, configuration elements described below include elements easily conceived by a person skilled in the art and elements substantially the same. Further, the configuration elements described below can be appropriately combined.

Figure 1:
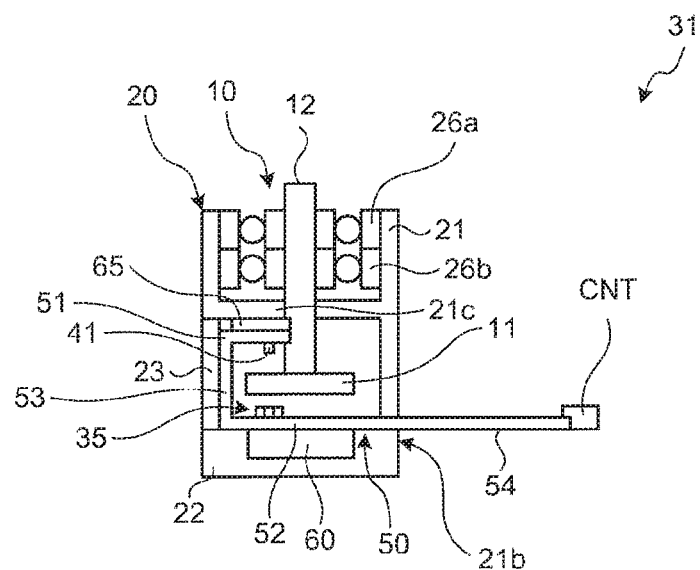
FIG. 1 is a configuration diagram of a sensor according to an embodiment of the present invention.
Figure 2:
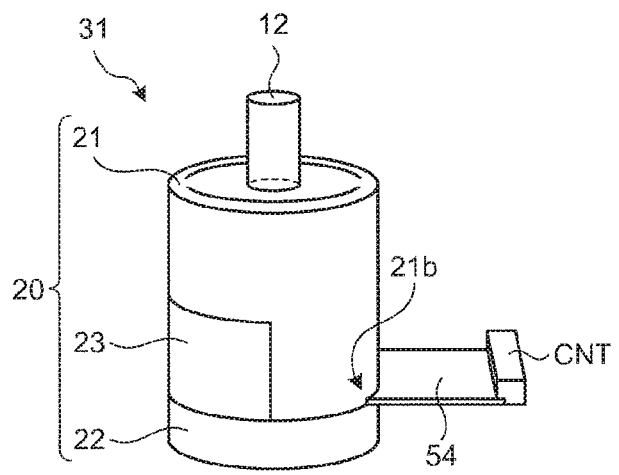
FIG. 2 is an external perspective view of the sensor.
Figure 3:
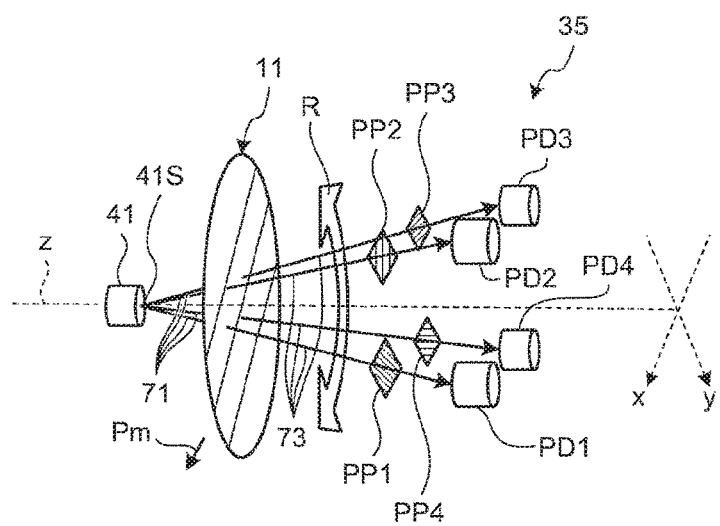
FIG. 3 is an explanatory diagram for describing an example of arrangement of a generating unit, an optical scale, and a detecting unit.
Figure 4:
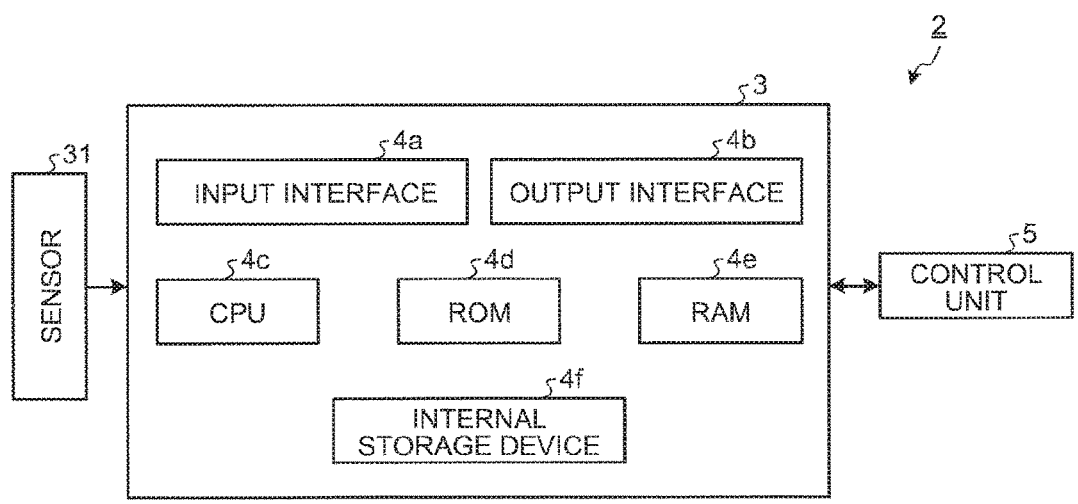
FIG. 4 is a block diagram of an optical encoder.
Figure 5:
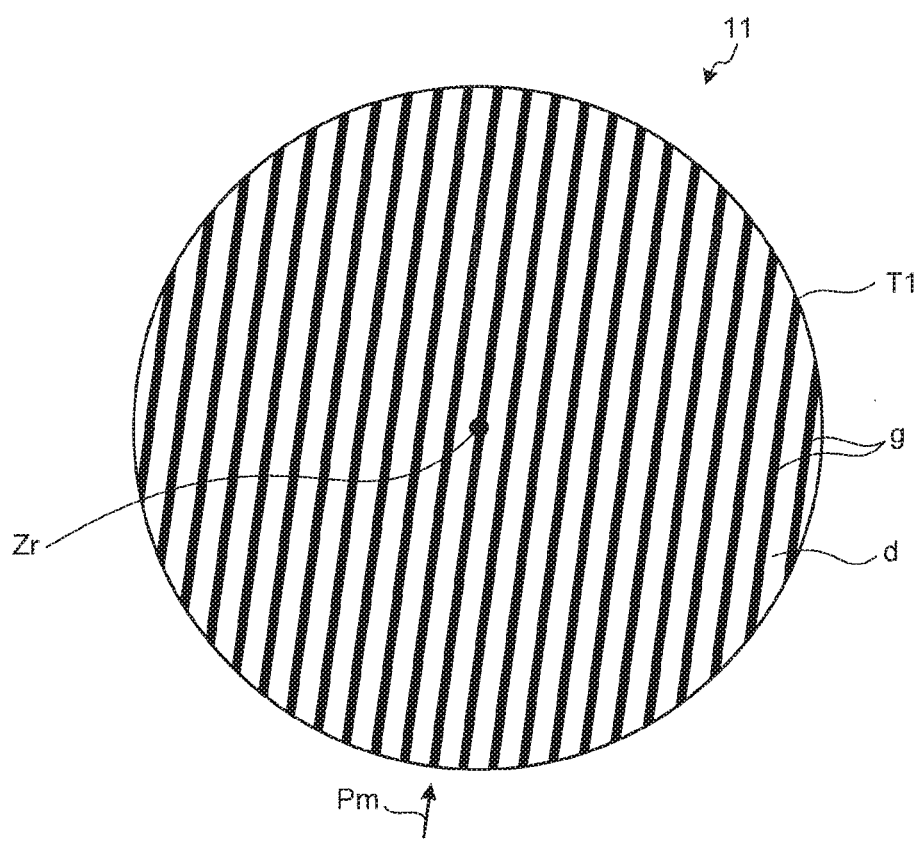
FIG. 5 is an explanatory diagram illustrating an example of a pattern of the optical scale.

FIG. 1 is a configuration diagram of a sensor 31 according to an embodiment of the present invention. FIG. 2 is an external perspective view of the sensor 31. FIG. 1 is a schematic sectional view of FIG. 2. FIG. 3 is an explanatory diagram for describing an example of arrangement of a generating unit 41, an optical scale 11, and a detecting unit 35. FIG. 4 is a block diagram of an optical encoder 2. FIG. 5 is an explanatory diagram illustrating an example of a pattern of the optical scale 11. The sensor 31 includes the generating unit 41 that generates an object to be detected made of electromagnetic waves (for example, light), the detecting unit 35 that detects the object to be detected generated by the generating unit 41 across a region to be detected, and a substrate 50 at which the generating unit 41 and the detecting unit 35 are provided. In the present embodiment, the sensor 31 further includes a rotor 10 and a stator 20. The rotor 10 includes a shaft 12 and a rotary body (optical scale 11). The shaft 12 is connected to a rotary machine such as a motor, and the rotary body is attached to an end portion of the shaft 12 and rotatably provided in a region to be detected. Note that the region to be detected is a space between the generating unit 41 and the detecting unit 35. The generating unit 41 in the present embodiment is a light-emitting element that emits light. To be specific, the generating unit 41 includes, for example, a light-emitting diode (point light source) as a light-emitting element. The detecting unit 35 in the present embodiment is a light-receiving element that receives the light emitted from the generating unit 41 serving as a light-emitting element. To be more specific, the detecting unit of the present embodiment includes four light-receiving elements including a first light-receiving unit PD1 having a polarizing layer PP1, a second light-receiving unit PD2 having a polarizing layer PP2, a third light-receiving unit PD3 having a polarizing layer PP3, and a fourth light-receiving unit PD4 having a polarizing layer PP4. In FIG. 3, the polarizing layers PP1 to PP4, and the first light-receiving unit PD1 to the fourth light-receiving unit PD4 are drawn in a separate manner to illustrate that incident light 73 from light source light 71 emitted from the generating unit 41 to the light-receiving units (the first light-receiving unit PD1 to the fourth light-receiving unit PD4) passes through the polarizing layers PP1 to PP4. However, in reality, the polarizing layers PP1 to PP4, and the first light-receiving unit PD1 to the fourth light-receiving unit PD4 are in contact with each other.

Figure 6:
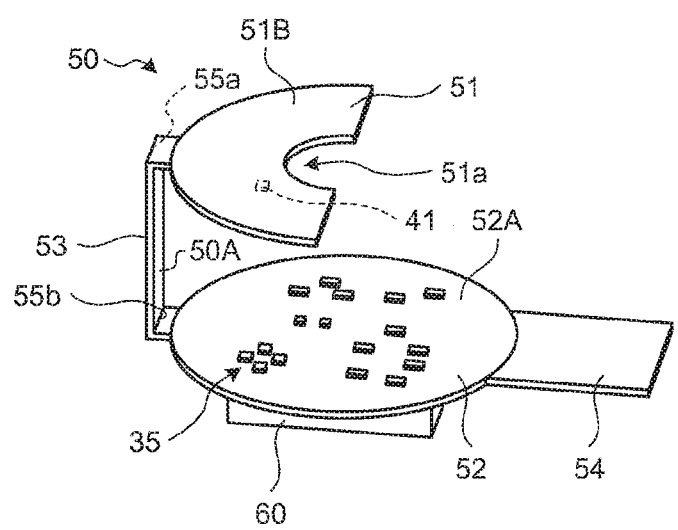
FIG. 6 is a perspective view illustrating an example of a substrate.
Figure 7:
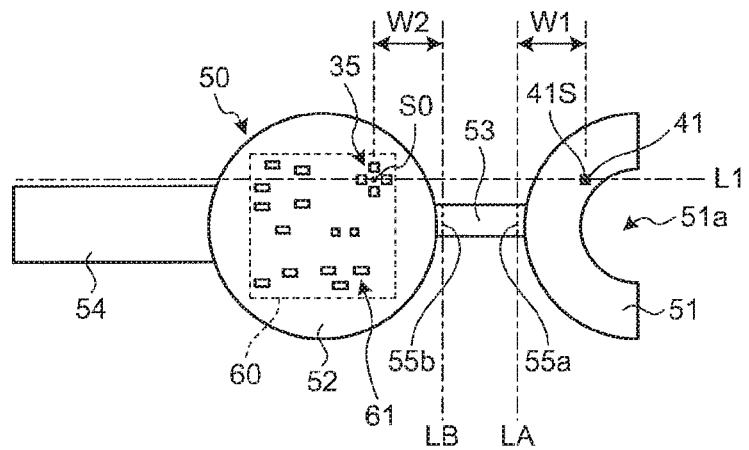
FIG. 7 is a plan view illustrating an example of the substrate before the substrate is bent.
Figure 8:
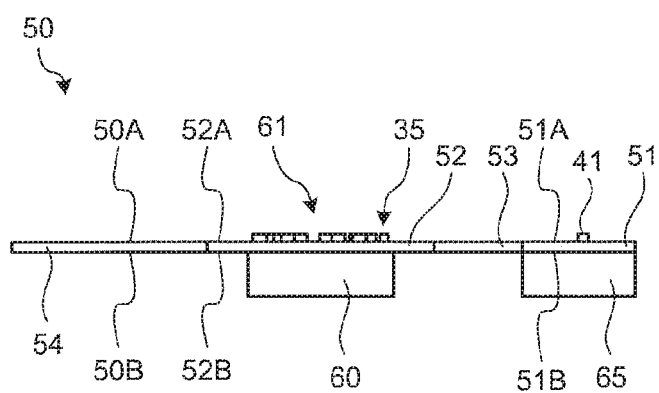
FIG. 8 is a diagram illustrating a correspondence relation between circuit arrangement in a surface where the generating unit and the detecting unit are provided, and a configuration provided at a back surface thereof.
Figure 9:
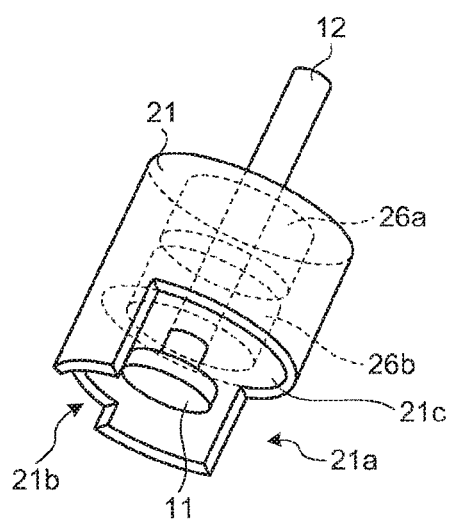
FIG. 9 is a perspective view illustrating an example of a body of a stator and a configuration provided in the body.
Figure 10:
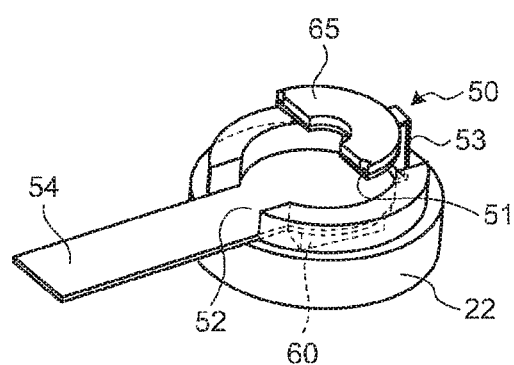
FIG. 10 is a perspective view illustrating an example of a configuration provided in a chassis of the stator.
Figure 11:
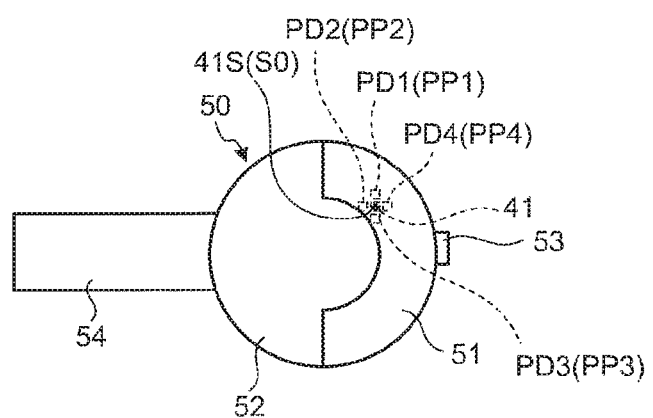
FIG. 11 is a diagram illustrating an example of a positional relation between the generating unit and the detecting unit.
Figure 12:
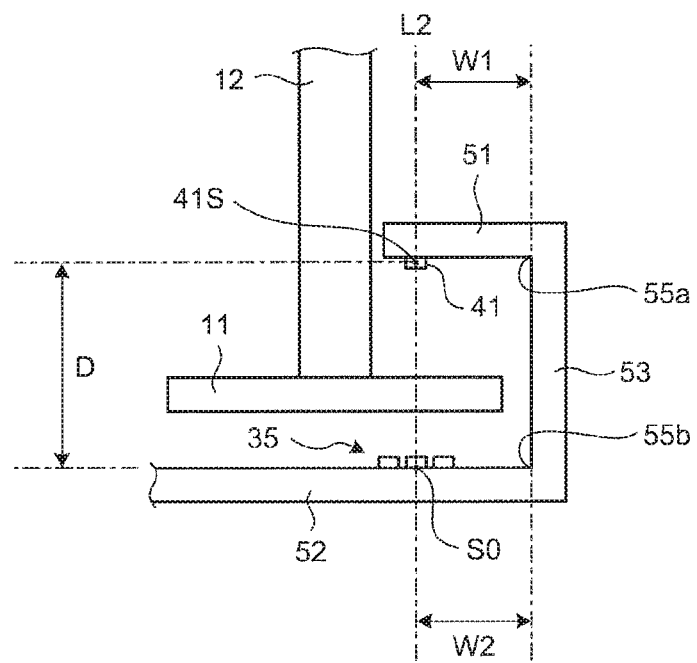
FIG. 12 is a diagram illustrating an example of a positional relation between the generating unit and the detecting unit.
Figure 13:
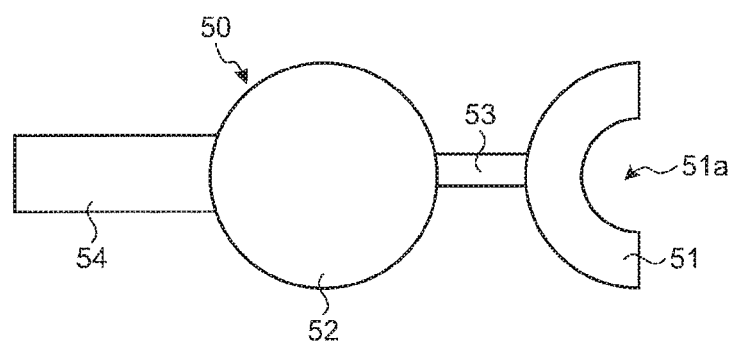
FIG. 13 is a plan view illustrating an example of the substrate before circuits are mounted thereon.
Figure 14:
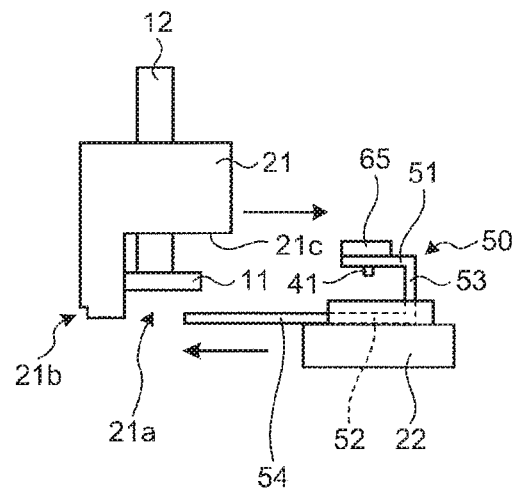
FIG. 14 is a diagram illustrating an example of assembly of the stator for providing the optical scale in a region to be detected.
Figure 15:
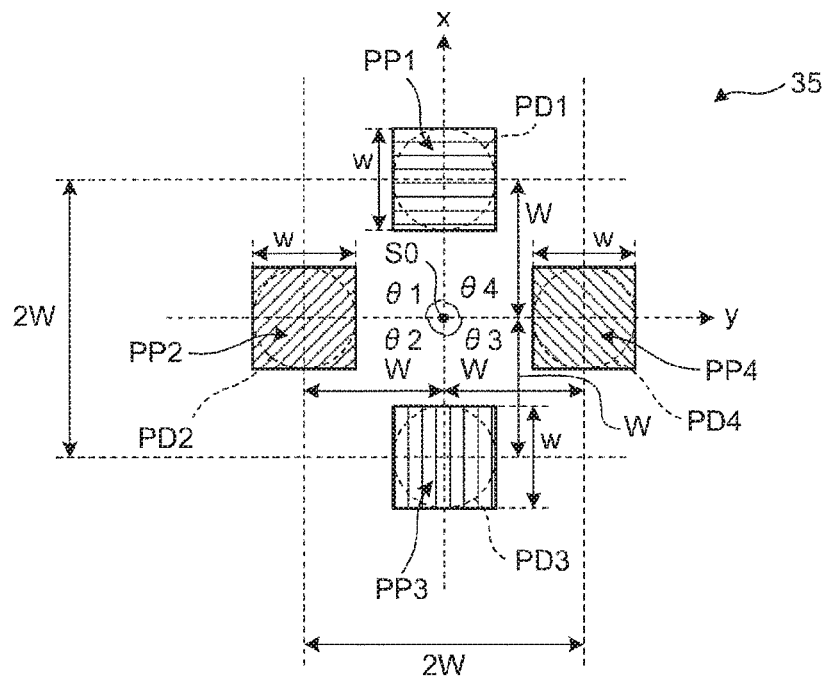
FIG. 15 is an explanatory diagram for describing an example of the detecting unit.

FIG. 6 is a perspective view illustrating an example of the substrate 50. FIG. 7 is a plan view illustrating an example of the substrate 50 before the substrate 50 is bent. FIG. 8 is a diagram illustrating an example of a correspondence relation between circuit arrangement in a surface at which the generating unit 41 and the detecting unit 35 are provided, and a configuration provided at a back surface thereof. FIG. 9 is a perspective view illustrating an example of a body 21 of the stator 20 and a configuration provided in the body 21. FIG. 10 is a perspective view illustrating an example of a configuration provided in a chassis 22 of the stator 20. FIGS. 11 and 12 are diagrams illustrating an example of a positional relation between the generating unit 41 and the detecting unit 35. FIG. 13 is a plan view illustrating an example of a substrate before circuits are mounted thereon. FIG. 14 is a diagram illustrating an example of assembly of the stator 20 for providing the optical scale 11 in the region to be detected. FIG. 15 is an explanatory diagram for describing an example of the detecting unit 35. In the substrate 50, a first portion 51 provided with the generating unit 41 and a second portion 52 provided with the detecting unit 35 are integrated. For example, as illustrated in FIGS. 6 and 7, the substrate 50 is one substrate including the semi-arc-shaped first portion 51 and the circular second portion 52. The substrate 50 is made of, for example, a flexible printed board (flexible printed circuits: FPC), and on which various circuits (for example, an IC circuit 60 illustrated in FIG. 6) including the generating unit 41 and the detecting unit 35 are mounted. To be more specific, the FPC is, for example, a wiring substrate having flexibility, which is obtained by using an insulator made of a polyimide film or a photo solder resist film as a base film, forming an adhesive layer and a conductor layer on the base film, and coating the conductor layer except a terminal portion (including a soldering portion) with an insulator. The conductor layer is made of an electrical conductor such as copper, and is provided with a signal line and a power line connected to components of various circuits with a pattern of the conductor layer. A specific configuration of the flexible substrate adaptable in the present invention is not limited thereto and can be changed appropriately. The various circuits such as the IC circuit 60 except the detecting unit 35 and the generating unit 41 form a preamplifier AMP, a differential operational circuit DS, a filter circuit NR, a multiplication AP, and the like illustrated in FIG. 21 described below. Hereinafter, the surface of the substrate 50, at which the generating unit 41 and the detecting unit 35 are provided, may be described as surface 50A, and a surface on an opposite side of the surface 50A may be described as back surface 50B (see FIG. 8). Further, a surface 51A of the first portion 51 and a surface 52A of the second portion 52, of the surface 50A of the substrate 50, may be described in a distinctive manner. Further, a back surface 51B of the first portion 51 and a back surface 52B of the second portion 52, of the back surface 50B of the substrate 50, may be described in a distinctive manner.

In the substrate 50, a plate support member for keeping a surface at which an electronic component is provided in a plane manner is attached to a back-side surface of at least one of the surface of the first portion 51 at which electronic components including the generating unit 41 are provided, and the surface of the second portion 52 at which electronic components including the detecting unit 35 are provided. To be specific, for example, as illustrated in FIG. 7, a component 61 is provided at the surface (the surface 52A) of the second portion 52 at which the light-receiving elements are provided. The component 61 and photodiodes (the first light-receiving unit PD1 to the fourth light-receiving unit PD4) that constitute the light-receiving elements are provided inside a mounting range of the IC circuit 60 on the back surface 52B. The component 61 is another circuit provided at the surface (surface 52A) of the second portion 52 at which the light-receiving elements are provided. To be specific, the component 61 includes circuit components such as an IC chip, a resistor, and a capacitor. The IC circuit 60 is, for example, an integrated circuit for which quad flat no lead package (QFN) is employed. As described above, the support member of the second portion 52 in the present embodiment is the package of the integrated circuit (IC circuit 60), and a position on the second portion 52 at which the package is provided and a position on the second portion 52 at which one or more electronic components (for example, the detecting unit 35 and the component 61) are provided are placed on opposite sides of the substrate 50 and overlap each other in plan view. Note that the package system of the integrated circuit is not limited to the QFN system as long as the package has a support structure that can function as the support member that can keep the surface (for example, the surface 52A of the second portion 52) on an opposite side of the surface at which the integrated circuit is provided, in a plane manner. Note that, in the present embodiment, the component 61 including an IC chip, a resistor, and a capacitor, which is the other circuit provided at the surface 52A of the second portion 52, includes a package circuit connected to wiring by soldering, and a bare chip connected to wiring by a method such as wire bonding. However, this is an example and the component 61 is not limited to the example. The component 61 may be either the package circuit or the bare chip, or may be a circuit in which a part or all of the circuit employs another system.

Further, as illustrated in FIG. 8, in the first portion 51 of the present embodiment, a support substrate 65 is provided on a back side of the surface at which the light-emitting element (see FIG. 24) that is a packaged light-emitting device 41U is provided. The support substrate 65 is, for example, a semi-arc-shaped plate member corresponding to the semi-arc shape of the first portion 51. To be more specific, the first portion 51 and the support substrate 65 have a semi-arc-shaped plate surface corresponding to one of two plate surfaces, which are obtained by splitting, along the diameter, a doughnut-shaped (arc-shaped) disk surface provided with a circular hole having a smaller diameter than the diameter of the disk surface in the center. The support substrate 65 is made of a resin having insulation properties, for example. As described above, the support member of the first portion 51 in the present embodiment is the plate member having insulation properties and formed to fit the shape of the first portion 51. The support substrate 65 in the present embodiment is an example of a non-circuit support member and is not limited to the example, and can be changed appropriately.

The substrate 50 includes a connecting portion 53 that connects the first portion 51 and the second portion 52. To be specific, for example, as illustrated in FIGS. 6 and 7, the connecting portion 53 is provided between the first portion 51 and the second portion 52 to connect an outer peripheral portion of the arc of the first portion 51 and an outer peripheral portion of the arc of the second portion 52.

The connecting portion 53 includes wiring connected to the generating unit 41 (or the detecting unit 35). In the present embodiment, the connecting portion 53 includes a signal line and a power line connected to the generating unit 41. To be specific, the wiring of the connecting portion 53 is provided as the signal line and the power line mounted on the FPC, for example. Note that no circuit is provided at the connecting portion 53 of the present embodiment. However, a component such as a circuit can be provided at the connecting portion 53.

As illustrated in FIGS. 6 and 7, the connecting portion 53 of the present embodiment has a smaller width in a direction perpendicular to an extending direction of the connecting portion 53 between the first portion 51 and the second portion 52 and along a plate surface of the substrate 50 than those of the first portion 51 and the second portion 52.

The substrate 50 includes a harness portion 54 including wiring connected to the generating unit 41 and the detecting unit 35. To be specific, for example, as illustrated in FIGS. 6 and 7, the harness portion 54 is provided to extend from the second portion 52 on a side opposite to the connecting portion 53 side. The harness portion 54 includes a signal line and a power line connected to the various circuits provided at the generating unit 41, the detecting unit 35, and the substrate 50. To be specific, the wiring of the harness portion 54 is provided as the signal line and the power line mounted on the FPC, for example. In the present embodiment, the wiring of the generating unit 41 is provided at the first portion 51, the connecting portion 53, and the harness portion 54. Further, the wiring of the detecting unit 35 is provided at the second portion 52 and the harness portion 54.

Further, the harness portion 54 is connected with a connector CNT, as illustrated in FIG. 1, for example. The connector CNT is an interface that connects the sensor 31 and another device (for example, a calculation device 3). The sensor 31 is connected with the calculation device 3 through the connector CNT. That is, the harness portion 54 functions as wiring that connects the various circuits provided at the substrate 50 and another device (for example, the calculation device 3). Note that a component such as a circuit may be provided at the harness portion 54.

The substrate 50 is provided such that the first portion 51 and the second portion 52 become parallel. To be specific, as illustrated in FIGS. 1 and 6, the substrate 50 is bent into a shape (C shape) in which the generating unit 41 and the detecting unit 35 face each other. In the present embodiment, the substrate 50 is bent to right angles at two bending positions 55a and 55b provided in the connecting portion 53 such that the surface 50A faces inside. That is, the substrate 50 is bent such that the first portion 51 and the second portion 52 form right angles with respect to the connecting portion 53, and exists at a position where the first portion 51 and the second portion 52 face each other. Accordingly, the first portion 51 and the second portion 52 are provided in a parallel manner, and the generating unit 41 and the detecting unit 35 face each other. In the present embodiment, a bending position close to the first portion 51, of the two bending positions 55a and 55b, is the bending position 55a, and a bending position close to the second portion 52 is the bending position 55b.

A surface of the first portion 51 at which the generating unit 41 is provided, and a surface of the second portion 52 at which the detecting unit 35 is provided are the same surface (the surface 50A) in the substrate 50. The surface at which the generating unit 41 is provided and the surface at which the detecting unit 35 is provided face each other, so that the positional relation between the generating unit 41 and the detecting unit 35 enables the detecting unit 35 to detect the object to be detected (for example, the light) generated by the generating unit 41, as illustrated in FIG. 3. Further, the space between the generating unit 41 and the detecting unit 35 that face each other serves as the region to be detected.

As described above, in the substrate 50, the first portion 51 provided with the generating unit 41, the second portion 52 provided with the detecting unit 35, and the connecting portion 53 that connects the first portion 51 and the second portion 52 are integrated, and the substrate 50 is bent to right angles at the two bending positions 55a and 55b such that the surface (the surface 51A) of the first portion 51 with the generating unit 41 thereon and the surface (the surface 52A) of the second portion 52 with the detecting unit 35 thereon are provided in a parallel manner and face each other. Here, as illustrated in FIG. 7, a first line LA serving as a bending line at the bending position 55a and a second line LB serving as a bending line at the bending position 55b are parallel. The bending lines refer to lines formed as folds at the bending positions 55a and 55b.

Further, a distance between a first point and the first line LA and a distance between a second point and the second line LB are equal. The first point is a generation center point of the object to be detected, which is generated by the generating unit 41, in the plane before the substrate 50 is bent. The second point is either the center of a detection region of the object to be detected that is detected by the detecting unit 35 or an arrangement center of the plurality of detection regions included in the detecting unit 35. To be specific, as illustrated in FIG. 7, a distance W1 between an emission point 41S of the light of the generating unit 41 in the present embodiment and the first line LA, and a distance W2 between an arrangement center S0 of the four light-receiving elements included in the detecting unit 35 and the second line LB are equal, the four light-receiving elements including the first light-receiving unit PD1, the second light-receiving unit PD2, the third light-receiving unit PD3, and the fourth light-receiving unit PD4. Here, the emission point 41S of the light of the generating unit 41 is the first point in the present embodiment, and the arrangement center S0 is the second point in the present embodiment.

Further, the first point and the second point exist on the same straight line perpendicular to the first line LA and the second line LB in the substrate 50 before the substrate 50 is bent. To be specific, as illustrated in FIG. 7, the emission point 41S of the light of the generating unit 41 and the arrangement center S0 exist on the same straight line L1 as the same straight line perpendicular to the first line LA and the second line LB.

Further, the four light-receiving elements are arranged at different positions on a predetermined plane, distances of the four light-receiving elements to one point on the predetermined plane are equal, and line segments that connect the one point and the centers of light-receiving regions of the four light-receiving elements form right angles with each other. To be specific, the first light-receiving unit PD1, the second light-receiving unit PD2, the third light-receiving unit PD3, and the fourth light-receiving unit PD4 as the four light-receiving elements included in the detecting unit 35 are arranged at an equal distance to the one point (the arrangement center S0) on the surface 52A of the second portion 52 of the substrate 50. Further, on the surface 52A, the first light-receiving unit PD1 and the third light-receiving unit PD3 are arranged at point-symmetrical positions across the arrangement center S0, and the second light-receiving unit PD2 and the fourth light-receiving unit PD4 are arranged at point symmetrical positions across the arrangement center S0. Further, in the present embodiment, the shapes and areas of the light-receiving regions of the first light-receiving unit PD1, the second light-receiving unit PD2, the third light-receiving unit PD3, and the fourth light-receiving unit PD4 are equal. Further, in the detecting unit 35, the center of the light-receiving region of the first light-receiving unit PD1 and the center of the light-receiving region of the third light-receiving unit PD3 are separately arranged by a distance 2W with respect to the arrangement center S0 as a middle point, and the center of the light-receiving region of the second light-receiving unit PD2 and the center of the light-receiving region of the fourth light-receiving unit PD4 are separately arranged by the distance 2W with respect to the arrangement center S0 as a middle point. In other words, the respective distances between the centers of the light-receiving regions of the four light-receiving elements including the first light-receiving unit PD1 to the fourth light-receiving unit PD4 and the arrangement center S0 are the distance W and are equal. Note that, in the present embodiment, the distances W from the centers of the light-receiving regions of the first light-receiving unit PD1, the second light-receiving unit PD2, the third light-receiving unit PD3, and the fourth light-receiving unit PD4 to the arrangement center S0 are larger than widths w of the first light-receiving unit PD1, the second light-receiving unit PD2, the third light-receiving unit PD3, and the fourth light-receiving unit PD4. Further, when a virtual axis that passes through the center of the light-receiving region of the first light-receiving unit PD1, the arrangement center S0, and the center of the light-receiving region of the third light-receiving unit PD3 is an x axis, and a virtual axis that passes through the center of the light-receiving region of the second light-receiving unit PD2, the arrangement center S0, and the center of the light-receiving region of the fourth light-receiving unit PD4 is a y axis, the x axis and the y axis are perpendicular to each other on the surface 52A of the second portion 52. That is, on the surface 52A of the second portion 52, an angle $\theta 1$ formed by the center of the light-receiving region of the first light-receiving unit PD1 and the center of the light-receiving region of the second light-receiving unit PD2 is 90°. Similarly, an angle $\theta 2$ formed by the center of the light-receiving region of the second light-receiving unit PD2 and the center of the light-receiving region of the third light-receiving unit PD3, an angle $\theta 3$ formed by the center of the light-receiving region of the third light-receiving unit PD3 and the center of the light-receiving region of the fourth light-receiving unit PD4, and an angle $\theta 4$ formed by the center of the light-receiving region of the fourth light-receiving unit PD4 and the center of the light-receiving region of the first light-receiving unit PD1 are 90°. As described above, the four light-receiving elements (the first light-receiving unit PD1, the second light-receiving unit PD2, the third light-receiving unit PD3, and the fourth light-receiving unit PD4) are equally arranged at 90° on the same circumference of a circle on the surface 52A around the arrangement center S0 as a center of the circle. Further, an xy plane by the x axis and the y axis is perpendicular to a z axis that connects the emission point 41S of the light of the generating unit 41 and the arrangement center S0. That is, when the surface 52A is looked down along a z axis direction from the generating unit 41 side, the emission point 41S overlaps with the arrangement center S0. That is, the straight line L2 (see FIG. 12) as a normal line of a predetermined plane (for example, the surface 52A of the second portion 52), which passes through the one point (arrangement center S0), passes through the center of the emission point 41S of the light of the light-emitting element (generating unit 41). Accordingly, the first light-receiving unit PD1, the second light-receiving unit PD2, the third light-receiving unit PD3, and the fourth light-receiving unit PD4 are arranged at equal distances from the emission point 41S of the light of the light emitting generating unit 41.

One of the first portion 51 and the second portion 52 is smaller than the other. To be specific, for example, as illustrated in FIGS. 6 and 7, the diameter of the arc-shaped first portion 51 in the present embodiment is approximately the same as the diameter of the circular second portion 52. Note that the first portion 51 has a semi-arc shape provided with a semicircular notch 51a on an inner peripheral side of the semicircular FPC. Therefore, the area of the first portion 51 occupying the substrate 50 is smaller than the area of the second portion 52.

The detecting unit 35 detects change in the object to be detected (for example, an electromagnetic wave of light or the like) caused by change in a physical quantity in the region to be detected. The change in a physical quantity is, for example, due to rotation of the rotary body existing in the region to be detected. To be specific, for example, as illustrated in FIGS. 1 to 3, the optical scale 11 of the rotor 10 is provided in the region to be detected. The sensor 31 is a sensor that performs an output according to change of a detection result of the object to be detected due to rotation of the optical scale 11 as the rotary body. That is, the sensor 31 functions as a rotary encoder that detects an angular position of a rotation drive body connected to the rotor 10 to transmit rotation motion to the rotor 10.

The rotor 10 includes the optical scale 11 that is a circular plate (or polygonal) member illustrated in FIG. 5. The optical scale 11 is formed of, for example, silicon, glass, or polymeric material. The optical scale 11 may have a circular ring shape or a hollow shape. In the optical scale 11 illustrated in FIG. 5, a signal track T1 is formed on one plate surface. Further, in the rotor 10, the shaft 12 is attached to the other plate surface. If the optical scale 11 is inclined but the inclined angle is small, the inclination has little influence on the function of polarization separation. The optical scale 11 in the present embodiment functions as a member that exerts influence on the light by being operated in the region to be detected that is a space between the light-emitting element (the generating unit 41) and the light-receiving elements (the detecting unit 35).

The stator 20 is made of a member having light shielding properties, which surrounds bearings 26a and 26b, the shaft 12, the optical scale 11 attached to an end portion of the shaft 12, and the detecting unit 35. Therefore, extraneous optical noises can be suppressed inside the stator 20. The stator 20 in the present embodiment functions as a housing that houses the substrate 50 and the member (the optical scale 11). The stator 20 includes a first housing that operably supports the member, and a second housing to which a part of the substrate 50 is fixed. To be specific, the stator 20 includes, for example, the body 21 functioning as the first housing, the chassis 22 functioning as the second housing, and a cover 23, as illustrated in FIGS. 9 and 10. The body 21 is a housing that rotatably supports the shaft 12 through the bearings 26a and 26b. An inner periphery of the body 21 is fixed to outer rings of the bearings 26a and 26b, and an outer periphery of the shaft 12 is fixed to inner rings of the bearings 26a and 26b. When the shaft 12 is rotated by rotation of the rotary machine such as a motor, the optical scale 11 is rotated around a rotation center Zr as an axial center in conjunction with the shaft 12. The body 21 includes an opening portion 21a for attaching the chassis 22 provided with the substrate 50 to the body 21. The substrate 50 is fixed to the chassis 22 such that the chassis 22 comes in contact with at least a part of the surface (the back surface) of the second portion 52 of the substrate 50 on an opposite side to the side provided with the detecting unit 35. To be specific, as described above, the IC circuit 60 as a component that is included in the sensor 31 is provided at the back surface 50B of the substrate 50. The chassis 22 has, for example, a shape that covers the IC circuit 60 on the back surface from an outside and comes in contact with a circular outer peripheral portion of the second portion 52, as illustrated in FIG. 10. The connecting portion 53 of the substrate 50 bent into a C shape is fixed to the chassis 22, thereby to stand from the second portion 52 supported by the chassis 22. As described above, in the present embodiment, the substrate 50 is fixed to the chassis 22 as the second portion 52 is fixed to the chassis 22. The cover 23 is a member that forms a part of the cylindrical outer peripheral surface of the stator 20. The cover 23 is provided on the opening portion 21a side of the body 21, that is, on a side opposite to a notch 21b side through which the harness portion 54 extends from the chassis 22. The cover 23 is assembled to cover the opening portion 21a in a state where the body 21 and the chassis 22 are assembled, so that the body 21, the chassis 22, and the cover 23 form the cylindrical stator 20, and shield the inside of the stator 20 from optical noises from an outside. As described above, the chassis 22 and the cover 23 function as a cover of the body 21 as a housing.

Further, a surface of the first portion 51 that is opposite to another surface of the first portion 51 facing the region to be detected adheres to the first housing (for example, the body 21). To be specific, the surface (the back surface 51B) of the first portion 51 that is opposite to the other surface of the first portion 51 facing the region to be detected adheres to the first housing through a plate member (for example, the support substrate 65). To be more specific, the support substrate 65 of the present embodiment has two surfaces affixed to a tape having adhesiveness, the two surfaces including a surface coming in contact with the first portion 51 and a surface on an opposite side of the aforementioned surface. The tape is a so-called double sided tape, and both surfaces have adhesiveness. That is, one surface of the support substrate 65 adheres to the back-side surface (the back surface 51B) of the first portion 51 through the tape. Further, the other surface of the support substrate 65 has adhesiveness in a state where the one surface adheres to the first portion 51. The other surface adheres to a surface of the body 21 through the tape, the surface of the body 21 being a surface from which the shaft 12 extends from the body 21, and facing on the chassis 22 side (hereinafter, the surface is described as adhesive surface 21c). As described above, one of the first portion 51 and the second portion 52 (the second portion 52 in the present embodiment) is fixed to the second housing (chassis 22), and the surface of the other of the first portion 51 and the second portion 52 (the first portion 51 in the present embodiment) that is opposite to the other surface of the other facing the region to be detected adheres to the first housing (the body 21). Further, the other surface of the plate member (for example, the support substrate 65) adheres to the first housing (the body 21) in a state where the one surface of the plate member (for example, the support substrate 65) adheres to the surface (the back surface 51B) of the other that is opposite to the other surface of the other facing the region to be detected. Note that the plate member (for example, the support substrate 65) lying between the surface (for example, the back surface 51B) of the other (for example, the first portion 51) of the first portion 51 and the second portion 52 that is opposite to the other surface of the other facing the region to be detected, and the first housing (for example, the body 21) has desirably higher rigidity than the substrate 50.

Note that, in the present embodiment, the surface of the first portion 51 that is opposite to the other surface of the other facing the region to be detected adheres to the first housing through the support substrate 65. However, this is an example of a specific form of adhesion, and the adhesion is not limited thereto. For example, the back surface 51B of the first portion 51 may adhere to the adhesive surface 21c with an adhesive or a tape (a double sided tape or the like). To be specific, for example, an adhesive is applied to several points of near an outer periphery or an inner peripheral portion of the support substrate 65 in a dotted manner, the support substrate 65 and the back surface 51B of the first portion 51 may be spot-fixed, and the support substrate 65 and the adhesive surface 21c may be spot-fixed. Further, as reinforcement until the adhesive is cured in the spot fixation, the tape may be further used together. Further, the relation between the first portion 51 and the second portion 52 may be vice versa. That is, the first portion 51 may be fixed to the second housing, and a surface (the back surface 52B) of the second portion 52 that is opposite to another surface of the second portion 52 facing the region to be detected may adhere to the first housing. Note that, in this case, for example, the configuration of the substrate 50 and the circuits (for example, the component 61 and the like) provided at the substrate 50 have forms in consideration of interference and the like to the configuration of the housing (for example, the stator 20), such as the shape of the second portion 52 being similar to the shape of the first portion 51 in the present embodiment.

In a case of using the adhesive, the adhesive is applied to the first housing (for example, the adhesive surface 21*c* of the body 21), or the surface of the other of the first portion 51 and the second portion 52 that is opposite to the other surface of the other facing the region to be detected, and the first housing and the other are simply brought in contact, so that the surface of the other that is opposite to the other surface of the other facing the region to be detected can adhere to the first housing. Therefore, assembly of the sensor 31 becomes easier.

When the shaft 12 of the rotor 10 is rotated, the optical scale 11 is relatively moved with respect to the detecting unit 35 in an R direction, for example, as illustrated in FIG. 3. Accordingly, the signal track T1 of the optical scale 11 is relatively moved with respect to the detecting unit 35. In the optical scale 11, a polarization direction Pm of a polarizer in the plane is directed to a predetermined direction, and the polarization direction Pm is changed due to the rotation. The detecting unit 35 can receive the incident light (transmission light) 73, which is the light source light 71 of the generating unit 41 transmitted through the optical scale 11 and entering the detecting unit 35, and can read the signal track T1 of the optical scale 11 illustrated in FIG. 5.

The optical encoder 2 includes the above-described sensor 31 and the calculation device 3, and the sensor 31 is connected to the calculation device 3 as illustrated in FIG. 4. The calculation device 3 is connected with a control unit 5 of the rotary machine such as a motor, for example.

The optical encoder 2 detects the incident light 73, which is the light source light 71 transmitted through the optical scale 11 and entering the optical encoder 2, with the detecting unit 35. The calculation device 3 calculates relative positions of the rotor 10 of the sensor 31 and the detecting unit 35 from a detection signal of the detecting unit 35, and outputs information on the relative positions, as a control signal, to the control unit 5 of the rotary machine such as a motor.

The calculation device 3 is, for example, a computer such as a personal computer (PC), and includes an input interface 4*a*, an output interface 4*b*, a central processing unit (CPU) 4*c*, a read only memory (ROM) 4*d*, a random access memory (RAM) 4*e*, and an internal storage device 4*f*. The input interface 4*a*, the output interface 4*b*, the CPU 4*c*, the ROM 4*d*, the RAM 4*e*, and the internal storage device 4*f* are connected through an internal bus. Note that the calculation device 3 may be configured from a dedicated processing circuit.

The input interface 4*a* receives an input signal from the detecting unit 35 of the sensor 31, and outputs the input signal to the CPU 4*c*. The output interface 4*b* receives the control signal from the CPU 4*c*, and outputs the control signal to the control unit 5.

Programs such as a basic input output system (BIOS) are stored in the ROM 4*d*. The internal storage device 4*f* is, for example, a hard disk drive (HDD) or a flash memory, and stores an operating system and an application program. The CPU 4*c* performs various functions by executing the programs stored in the ROM 4*d* and the internal storage device 4*f* while using the RAM 4*e* as a work area.

A database in which the polarization direction Pm by the optical scale 11 and the output of the detecting unit 35 are associated with each other is stored in the internal storage device 4*f*. Alternatively, a database in which a value of a distance D (see FIG. 12) between the emission point 41S of the light of the generating unit 41 and the arrangement center S0 (the detecting unit 35) are associated with location information of the optical scale 11 is stored in the internal storage device 4*f*.

The signal track T1 illustrated in FIG. 5 is formed such that an array of metallic thin wires (wires) g called wire grid pattern is formed in the optical scale 11 illustrated in FIG. 1. In the optical scale 11, the adjacent metallic thin wires g are arranged in parallel and in a linear manner, as the signal track T1. Therefore, the optical scale 11 has the same polarization axis regardless of the position irradiated with the light source light 71, and the polarization direction of the polarizer in the plane is directed to one direction.

Further, the optical scale 11 including the metallic thin wires g called wire grid pattern can enhance heat resistance properties, compared with a photoinduction polarization plate. Further, the optical scale 11 has a line pattern that without a local intersection portion. This makes the optical scale 11 highly accurate with less error. Further, the optical scale 11 can be stably manufactured by collective exposure or nanoprint technology, and thus the highly accurate optical scale 11 with less error can be obtained. Note that the optical scale 11 may be a photoinduction polarization plate.

The plurality of metallic thin wires g is arranged without intersecting with each other. A space between the adjacent metallic thin wires g is a transmissive region d through which all of a part of the light source light 71 can be transmitted. When the width of the metallic thin wire g and an interval between the adjacent metallic thin wires g, that is, the width of the metallic thin wire g and the width of the transmissive region d are made sufficiently smaller than a wavelength of the light source light 71 of the generating unit 41, the optical scale 11 can polarize and separate the incident light 73 of the light source light 71. Therefore, the optical scale 11 has a polarizer with a uniform polarization direction Pm in the plane. In the optical scale 11, the polarization axis of the incident light 73 entering the detecting unit 35 is changed according to the rotation of the optical scale 11 in a circumferential direction of rotation. In the present embodiment, in the change in the polarization axis, an increase and a decrease are repeated twice with respect to one rotation of the optical scale 11.

The optical scale 11 does not require fine segments having different polarization directions. Further, the optical scale 11 has the uniform polarization direction Pm and has no boundary of regions of different polarization directions Pm, and can suppress disorder of a polarization state of the incident light 73 due to the boundary. The optical encoder 2 of the present embodiment can decrease erroneous detection or a possibility of causing noises.

Figure 16:
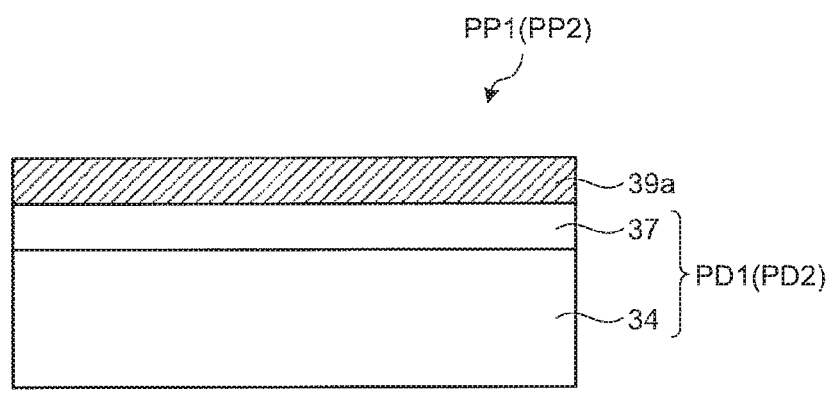
FIG. 16 is an explanatory diagram for describing an example of a first light-receiving unit of the detecting unit.
Figure 17:
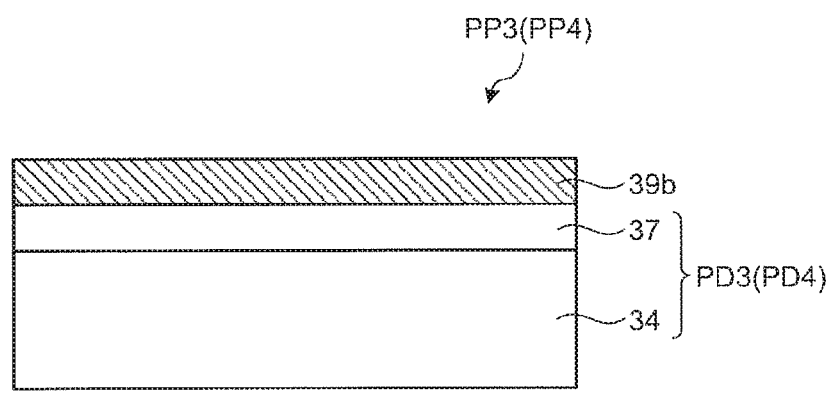
FIG. 17 is an explanatory diagram for describing an example of a third light-receiving unit of the detecting unit.

FIG. 16 is an explanatory diagram for describing an example of the first light-receiving unit PD1 of the detecting unit 35. FIG. 17 is an explanatory diagram for describing an example of the third light-receiving unit PD3 of the detecting unit 35. The generating unit 41 is, for example, a light-emitting diode. As illustrated in FIG. 3, the light source light 71 emitted from the generating unit 41 is transmitted through the optical scale 11, and through the polarizing layer PP1, the polarizing layer PP2, the polarizing layer PP3, and the polarizing layer PP4 as the incident light 73, and enters the first light-receiving unit PD1, the second light-receiving unit PD2, the third light-receiving unit PD3, and the fourth light-receiving unit PD4. The first light-receiving unit PD1, the second light-receiving unit PD2, the third light-receiving unit PD3, and the fourth light-receiving unit PD4 are arranged around the generating unit 41 in plan view from the z axis direction. The respective distances from the first light-receiving unit PD1, the second light-receiving unit PD2, the third light-receiving unit PD3, and the fourth light-receiving unit PD4 to the arrangement center S0 are equal. With this structure, a calculation load of the CPU 4c as calculation means can be reduced.

As illustrated in FIG. 16, the first light-receiving unit PD1 includes a silicon substrate 34, a light-receiving unit 37, and a first polarizing layer 39a. Further, as illustrated in FIG. 17, the third light-receiving unit PD3 includes a silicon substrate 34, a light-receiving unit 37, and a second polarizing layer 39b. For example, the silicon substrate 34 is an n-type semiconductor, and the light-receiving unit 37 is a p-type semiconductor. A photodiode formed by PN junction can be configured from the silicon substrate 34 and the light-receiving unit 37. The first polarizing layer 39a and the second polarizing layer 39b can be formed of a photoinduction polarizing layer, or a wire grid pattern in which the metallic thin wires are arrayed in parallel. The first polarizing layer 39a separates a component in a first polarization direction from the incident light 73 entering the optical scale 11 illustrated in FIG. 3 from the light source light 71, and the second polarizing layer 39b separates a component in a second polarization direction from the incident light 73. Favorably, a polarization axis of first separation light and a polarization axis of second separation light are relatively different by 90°. With the configuration, the CPU 4c of the calculation device 3 can facilitate the calculation of a polarization angle.

Similarly, description will be given using FIGS. 16 and 17. The second light-receiving unit PD2 includes the silicon substrate 34, the light-receiving unit 37, and the first polarizing layer 39a. Further, as illustrated in FIG. 17, the fourth light-receiving unit PD4 includes the silicon substrate 34, the light-receiving unit 37, and the second polarizing layer 39b. For example, the silicon substrate 34 is an n-type semiconductor, and the light-receiving unit 37 is a p-type semiconductor. A photodiode formed by PN junction can be configured from the silicon substrate 34 and the light-receiving unit 37. The first polarizing layer 39a and the second polarizing layer 39b can be formed of a photoinduction polarizing layer or a wire grid pattern in which the metallic thin wires are arrayed in parallel. The first polarizing layer 39a separates a component in the first polarization direction from the incident light 73 entering the optical scale 11 illustrated in FIG. 3 from the light source light 71, and the second polarizing layer 39b separates a component in the second polarization direction from the incident light 73. Favorably, a polarization axis of first separation light and a polarization axis of second separation light are relatively different by 90°. With the configuration, the CPU 4c of the calculation device 3 can facilitate the calculation of a polarization angle.

The first light-receiving unit PD1, the second light-receiving unit PD2, the third light-receiving unit PD3, and the fourth light-receiving unit PD4 receive the incident light 73 through the polarizing layers PP1, PP2, PP3, and PP4 that separate respective components in different polarization directions from the incident light 73. Therefore, favorably, the polarization axis separated by the polarizing layer PP1 and the polarization axis separated by the polarizing layer PP2 are relatively different by 45°. Favorably, the polarization axis separated by the polarizing layer PP2 and the polarization axis separated by the polarizing layer PP3 are relatively different by 45°. Favorably, the polarization axis separated by the polarizing layer PP3 and the polarization axis separated by the polarizing layer PP4 are relatively different by 45°. Favorably, the polarization axis separated by the polarizing layer PP4 and the polarization axis separated by the polarizing layer PP1 are relatively different by 45°. With this configuration, the CPU 4c of the calculation device 3 can facilitate the calculation of a polarization angle.

Figure 18:
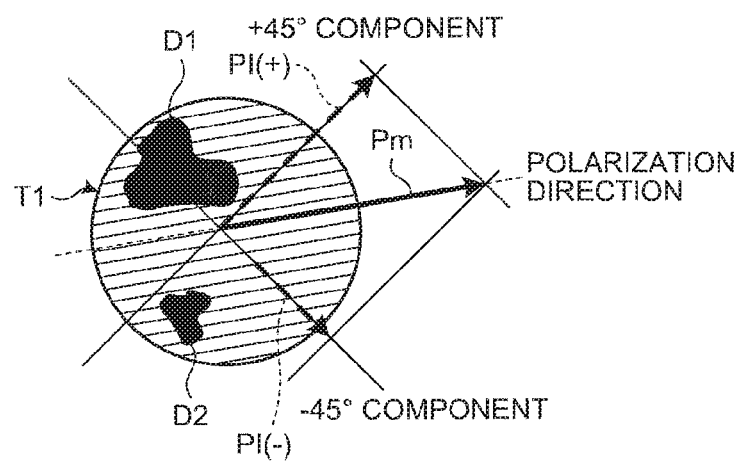
FIG. 18 is an explanatory diagram for describing separation of a polarized component by the optical scale.
Figure 19:
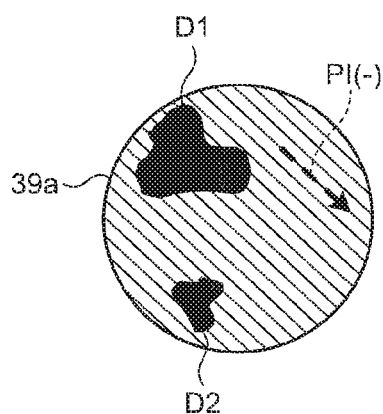
FIG. 19 is an explanatory diagram for describing separation of a polarized component by the optical scale.
Figure 20:
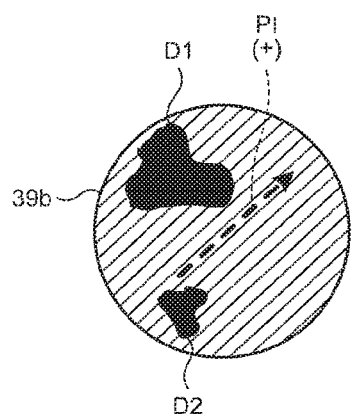
FIG. 20 is an explanatory diagram for describing separation of a polarized component by the optical scale.

FIGS. 18 to 20 are explanatory diagrams for describing separation of a polarized component by the optical scale 11. As illustrated in FIG. 18, the incident light polarized in the polarization direction Pm by the signal track T1 of the optical scale 11 enters. In FIG. 18, there are a foreign substance D1 and a foreign substance D2 within a sensing range. The polarization direction Pm of the incident light can be expressed by light intensity PI (−) as a component in the first polarization direction and light intensity PI (+) in the second polarization direction. As described above, the first polarization direction and the second polarization direction are favorably different directions by 90°, and have a +45° component and a −45° component with respect to a reference direction, respectively, for example. In FIGS. 18 to 20, an axial direction of the wire grid is illustrated in parallel with the sheet surface. However, if the wire grid is inclined at the same angle with respect to the sheet surface, but the inclination angle is small, the inclination has little influence on the function of polarization separation. That is, even if the optical scale 11 is inclined with respect to the rotation axis, the optical scale 11 functions as a polarization separation element.

As illustrated in FIG. 19, the first light-receiving unit PD1 detects the incident light through the first polarizing layer 39a that separates a component in the first polarization direction from the incident light, and thus detects the light intensity PI (−) of the component in the first polarization direction. As illustrated in FIG. 20, the third light-receiving unit PD3 detects the incident light through the second polarizing layer 39b that separates a component in the second polarization direction from the incident light, and thus detects the light intensity PI (+) of the component in the second polarization direction. Similarly, as illustrated in FIG. 19, the second light-receiving unit PD2 detects the incident light through the first polarizing layer 39a that separates a component in the first polarization direction from the incident light, and thus detects the light intensity PI (−) of the component in the first polarization direction. As illustrated in FIG. 20, the fourth light-receiving unit PD4 detects the incident light through the second polarizing layer 39b that separates a component in the second polarization direction from the incident light, and thus detects the light intensity PI (+) of the component in the second polarization direction.

Figure 21:
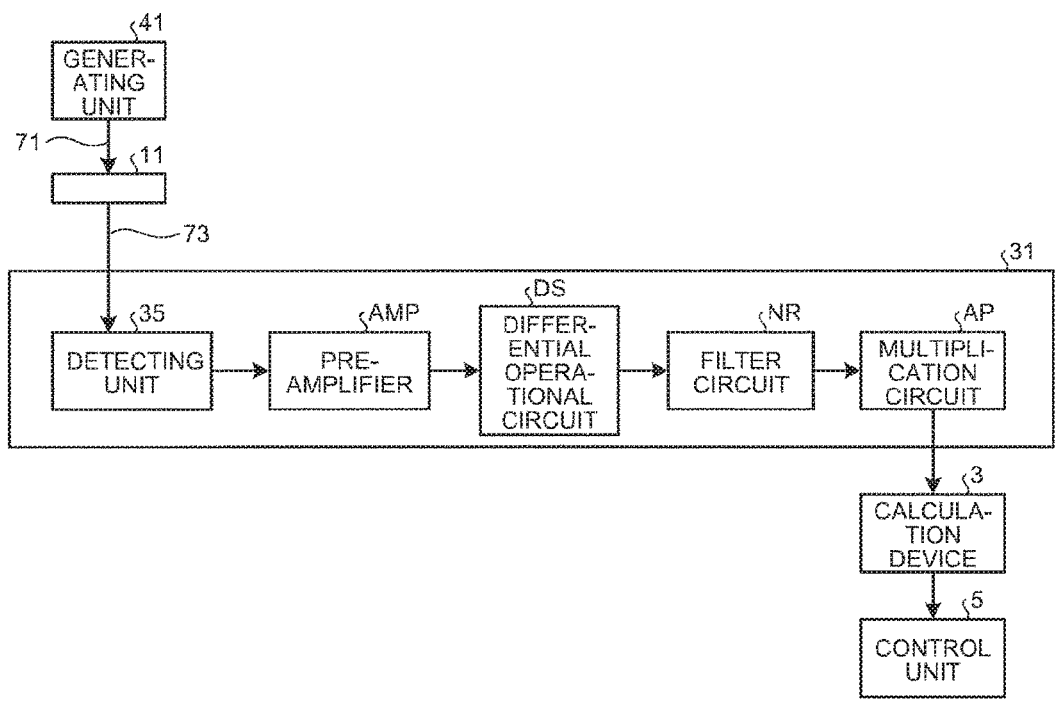
FIG. 21 is a functional block diagram of the optical encoder.
Figure 22:
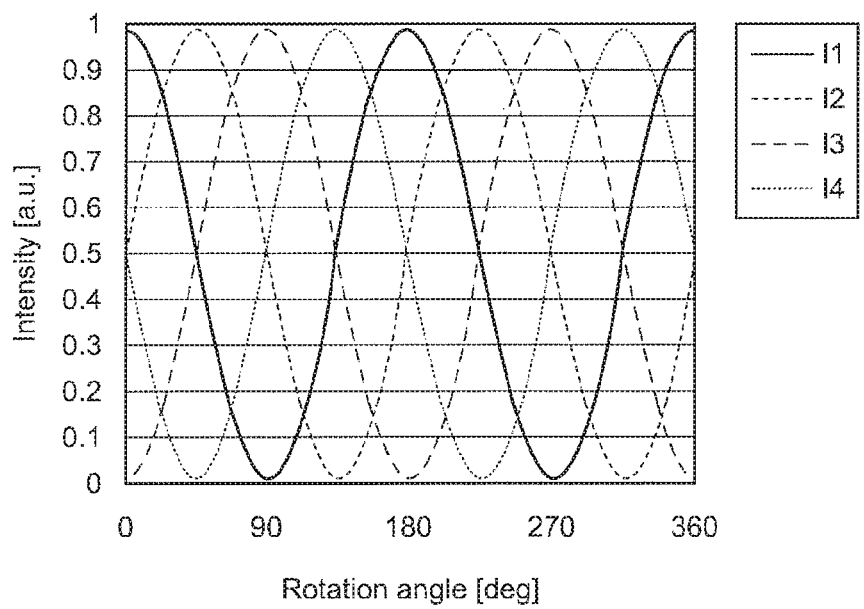
FIG. 22 is an explanatory diagram for describing a rotation angle of the optical scale and change in light intensity of polarized components of the light-receiving units.

FIG. 21 is a functional block diagram of the optical encoder 2. FIG. 22 is an explanatory diagram for illustrating a rotation angle of the optical scale 11 and change in the light intensity of polarized components of the light-receiving units. As illustrated in FIG. 21, the generating unit 41 emits the light on the basis of a reference signal, and irradiates the optical scale 11 with the light source light 71. The incident light 73 as transmission light is received by the detecting unit 35. A differential operational circuit DS performs differential operation processing using a detection signal that is output from the detecting unit 35 and amplified by a preamplifier AMP. The preamplifier AMP can be omitted according to the magnitude of the output of the detecting unit 35.

The differential operational circuit DS acquires the light intensity PI (−) of the component (the first separation light) in the first polarization direction, and the light intensity PI (+) of the component (the second separation light) in the second polarization direction, as the detection signals of the detecting unit 35. As illustrated in FIG. 22, respective outputs of the first light-receiving unit PD1, the second light-receiving unit PD2, the third light-receiving unit PD3, and the fourth light-receiving unit PD4 are, for example, light intensity I1, I2, I3, and I4 with shifted phases according to the rotation of the optical scale 11, where the outputs of the first light-receiving unit PD1 and the third light-receiving unit PD3, and the outputs of the second light-receiving unit PD2 and the fourth light-receiving unit PD4 correspond to the light intensity PI (−) and the light intensity PI (+), respectively.

The differential operational circuit DS calculates, according to the formulas (1) and (2), a differential signal Vc and a differential signal Vs that depend on the rotation of the optical scale 11, from the light intensity PI (−) of the component in the first polarization direction and the light intensity PI (+) of the component in the second polarization direction. The differential signal Vc is a signal corresponding to a so-called cosine (cos) component, and the differential signal Vs is a signal corresponding to a so-called sine (sin) component.

$$Vc=(I1-I3)/(I1+I3) \quad (1)$$

$$Vs=(I2-I4)/(I2+I4) \quad (2)$$

As described above, the differential operational circuit DS calculates a sum [I1+I3] of the light intensity and a difference [I1−I3] of the light intensity, and calculates the differential signal Vc by dividing the difference [I1−I3] of the light intensity by the sum [I1+I3] of the light intensity, on the basis of the light intensity I1 and the light intensity I3. Further, the differential operational circuit DS calculates a sum [I2+I4] of the light intensity and a difference [I2−I4] of the light intensity, and calculates the differential signal Vs by dividing the difference [I2−I4] of the light intensity by the sum [I2+I4] of the light intensity on the basis of the light intensity I2 and the light intensity I4. The differential signals Vc and Vs calculated according to the formulas (1) and (2) do not include parameters that are influenced by the light intensity of the light source light 71, and the output of the sensor 31 can decrease influence such as variation in the distance between the detecting unit 35 and the optical scale 11, and variation in the light intensity of the generating unit 41. The differential signals Vc and Vs satisfy a function of the rotation angle (hereinafter, referred to as polarization angle) β of the polarization axis of the optical scale 11, the polarization angle being the rotation angle of the optical scale 11. Note that, in a case of including auto power control (APC) that makes the quantity of light of the light source provided in the generating unit 41 constant, the above-described subtraction is unnecessary.

Figure 23:
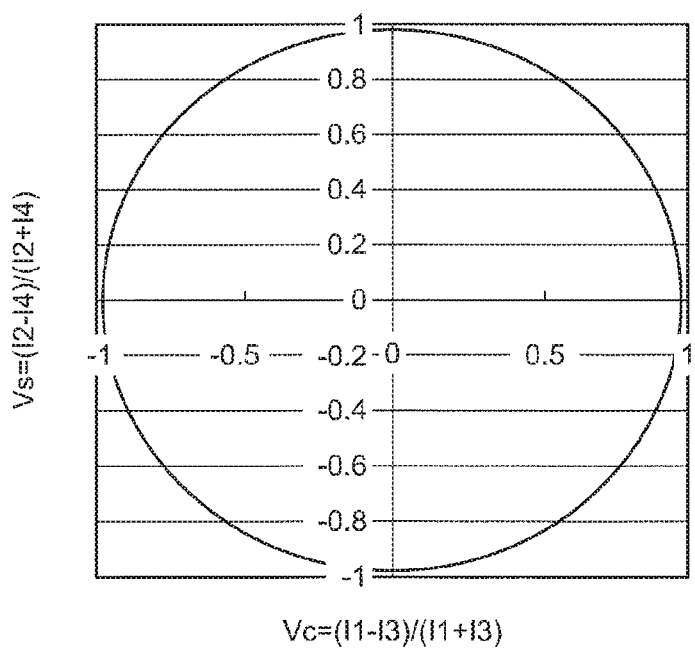
FIG. 23 is an explanatory diagram for describing a relation between the rotation angle and a Lissajous angle of the optical scale.

As illustrated in FIG. 21, the differential signals Vc and Vs are input to the filter circuit NR, and noises are removed. Next, the multiplication AP calculates the Lissajous pattern illustrated in FIG. 23 from the differential signals Vc and Vs, and identifies an absolute angle of the rotation angle of the rotor 10 rotated from an initial position. The differential signals Vc and Vs are differential signals with phases shifted by λ/4. Therefore, the Lissajous pattern taking a cosine curve of the differential signal Vc as the horizontal axis, and a sine curve of the differential signal Vs as the vertical axis is calculated, and a Lissajous angle is determined according to the rotation angle. For example, the Lissajous pattern illustrated in FIG. 23 goes the circle twice as the rotor is rotated once. The calculation device 3 has a function to store whether the rotation position of the optical scale 11 falls within a range from 0° (inclusive) to 180° (exclusive), or within a range from 180° (inclusive) to 360° (exclusive). Accordingly, the optical encoder 2 can be an absolute encoder that can calculate the absolute position of the rotor 10.

Figure 24:
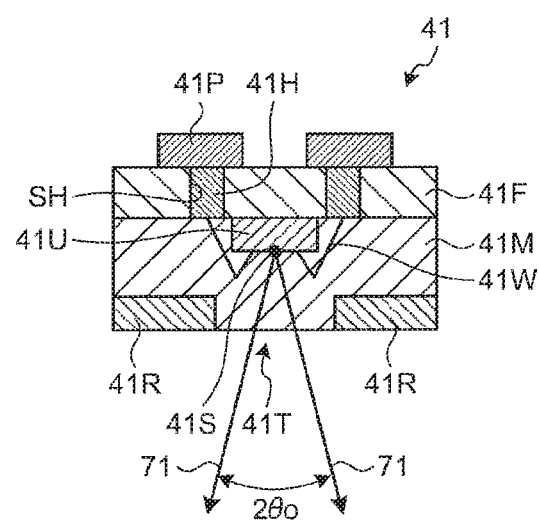
FIG. 24 is a diagram for describing the generating unit.

FIG. 24 is a diagram for describing the generating unit 41. The generating unit 41 illustrated in FIG. 24 is, for example, a light-emitting element in which the light-emitting device 41U such as a light-emitting diode is packaged. The light-emitting device 41U may have another configuration. To be specific, for example, the light-emitting device 41U may be a laser light source such as a vertical resonator surface light emitting laser, a filament, or the like. The generating unit 41 includes a base substrate 41F, a through conductive layer 41H embedded in a through hole SH, an external electrode 41P electrically connected with the through conductive layer 41H, the light-emitting device 41U mounted on the base substrate 41F, a bonding wire 41W that conducts and connects the light-emitting device 41U and the through conductive layer 41H, a sealing resin 41M that protects the light-emitting device 41U, and a light shielding film 41R.

The light shielding film 41R of the generating unit 41 exhibits a function as a diaphragm causing the light source light 71 emitted by the light-emitting device 41U to narrow down to fall within a range of an emission surface 41T. The emission surface 41T does not have a lens surface, and the light source light 71 exhibits light distribution of a predetermined angle 2θo with respect to a cross section of the emission surface 41T. The angle 2θo of the light distribution depends on the generating unit 41. The angle 2θo is, for example, 30°. However, the angle can be made larger or smaller than 30°.

The sensor 31 can use the generating unit 41 without a lens. An SN ratio can be improved by making the distance D between the emission point 41S of the light of the generating unit 41, and the arrangement center S0 (the detecting unit 35) short. The distances W to the first light-receiving unit PD1, the second light-receiving unit PD2, the third light-receiving unit PD3, and the fourth light-receiving unit PD4 can be arranged in a range in which the influence of the diffused light of the generating unit 41 can be decreased and the light can be received. Therefore, measurement accuracy of the sensor 31 and the optical encoder 2 is improved. Obviously, the generating unit 41 with a lens may be used.

Figure 25:
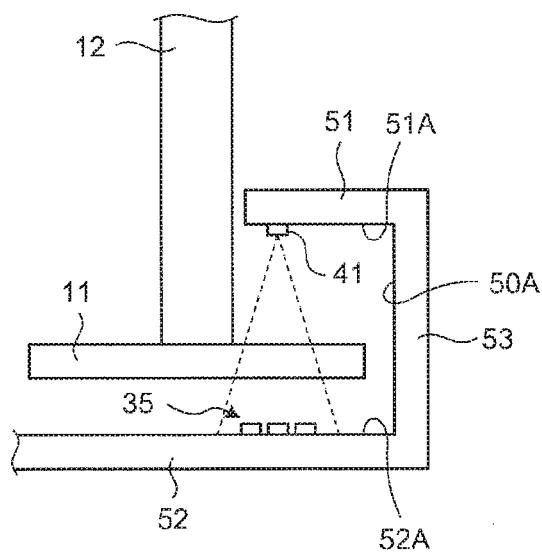
FIG. 25 is a diagram illustrating a relation between a generation range of the light from the generating unit and positions of the detecting unit and a shaft.

FIG. 25 is a diagram illustrating an example of a relation between a emission range of the light from the generating unit 41, and the positions of the detecting unit 35 and the shaft 12. In the present embodiment, the object to be detected generated by the generating unit 41 and detected by the detecting unit 35 is light. An emission angle (the angle 2θo) of the light source light 71 of the generating unit 41 can be arbitrarily set through design. Therefore, as illustrated in FIG. 25, the connecting portion 53 and the shaft 12 can fall outside the range of the emission angle of the light source light 71 while all of the light-receiving regions of the detecting unit 35 can fall within the range. However, it is difficult to bring the light source light 71 from the light-emitting diode as a light source to thoroughly fall within the emission range, and have no light leak. Further considering reflection light and the like after emission, it is difficult to prevent light (for example, diffused reflection light) other than the direct light source light 71 from entering the detecting unit 35. Therefore, in the present embodiment, with a view to decrease the reflection light, antireflection processing of light is applied to the surface at which the light-emitting element and the light-receiving elements of the substrate 50 are provided. To be specific, coating processing of coating the surface (the surface 50A) on the side provided with at least the light-emitting element (the generating unit 41) and the light-receiving elements (the detecting unit 35), of the plate surfaces of the substrate 50, with antireflection material such as black coating material having light absorbing properties, can be employed as the antireflection processing of light.

Further, considering a possibility that the light is reflected at an outer peripheral surface of the shaft 12, the antireflection processing may be applied to the shaft 12. In this case, the sensor 31 includes a scale (the optical scale 11) and a rotation support unit (the body 21 of the stator 20). The scale exerts influence on the light by being rotated and operated in the region to be detected that is a space between the light-emitting element (the generating unit 41) and the light-receiving element (the detecting unit 35). The rotation support unit includes the shaft 12 that rotatably supports the scale. The sensor 31 is a sensor with the shaft 12 to which the antireflection processing of light is applied. To be specific, for example, plating processing performed on a black oxide film or the above coating processing performed on the outer peripheral surface of the metal-made shaft 12 can be employed as the antireflection processing of light. With a similar idea, the antireflection processing may be applied to the inner peripheral surface of the stator 20 that houses the optical scale 11 and the substrate 50.

Figure 26:
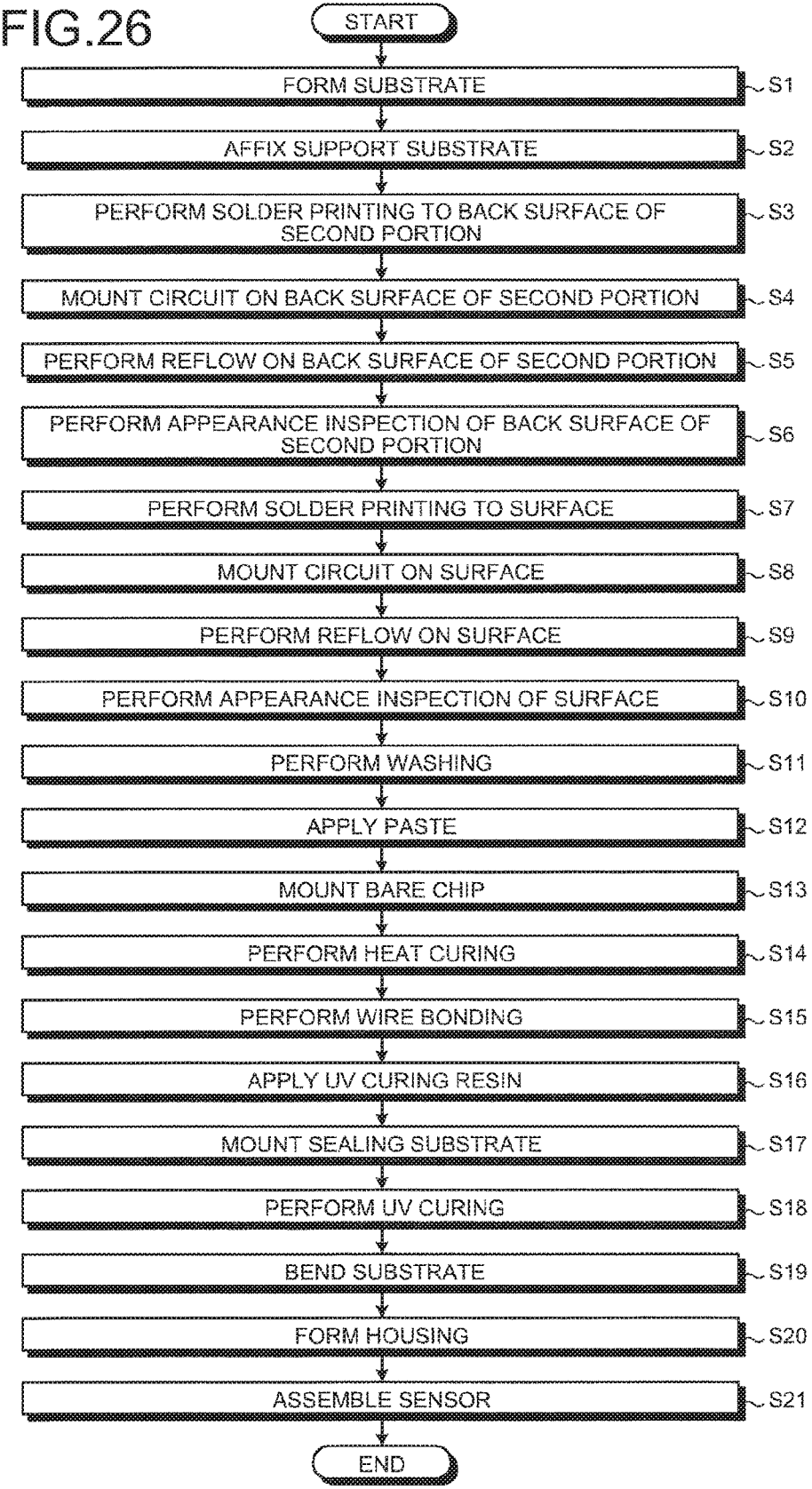
FIG. 26 is a flowchart illustrating an example of a flow of a process regarding manufacturing of a sensor.

Next, a method of manufacturing the sensor 31 will be described with reference to the flowchart of FIG. 26. FIG. 26 is a flowchart illustrating an example of a flow of a process regarding manufacturing the sensor 31. Hereinafter, a work process performed by mainly a manufacturing worker or by mainly a manufacturing machine operated by the manufacturing worker will be described. First, the substrate 50 in which the first portion 51 provided with the generating unit 41 and the second portion 52 provided with the detecting unit 35 are integrated is formed (step S1). To be specific, for example, as illustrated in FIG. 13, an FPC including the semi-arc-shaped first portion 51, the circular second portion 52, the connecting portion 53 that connects the first portion 51 and the second portion 52, and the harness portion 54 extending from the second portion 52 on the side opposite to the connecting portion 53 side is formed. In this process, the wiring such as the signal line and the power line connected to the various circuits, which are to be mounted on the substrate 50 in a subsequent process, is formed on the FPC. Further, the antireflection processing is applied to the surface of the FPC. At this time, the antireflection processing is prevented from being applied to the terminal portion to which the various circuits including the generating unit 41 and the detecting unit 35 are to be connected later. As described above, the method of manufacturing the sensor 31 (the optical sensor) according to the present embodiment includes the process of forming the substrate 50 in which the first portion 51 provided with the generating unit 41 (the light-emitting element) and the second portion 52 provided with the detecting unit 35 (the light-receiving elements) are integrated.

Next, the various components are attached to the substrate 50. To be specific, for example, first, the support substrate 65 is affixed to the back surface 51B of the first portion 51 (step S2). Next, various processes for providing the IC circuit 60 on the back surface 52B of the second portion 52 are conducted. To be specific, the IC circuit 60 is provided at the back surface 52B of the second portion 52 through the following steps: solder printing for mounting the IC circuit 60 on the back surface 52B of the second portion 52 (step S3), mounting of the IC circuit 60 on the back surface 52B of the second portion 52 (step S4), reflow by heating the back surface 52B side of the second portion 52 after mounting by the processing of step S4 (step S5), and appearance inspection of the soldering of the back surface 52B of the second portion 52 (step S6). As described above, the method of manufacturing the sensor 31 (the optical sensor) according to the present embodiment includes the process of attaching the plate support members (the IC circuit 60 and the support substrate 65) to the back-side surfaces (the back surfaces 51B and 52B) of the surface (the surface 51A) of the first portion 51 at which the electronic components including the generating unit 41 (the light-emitting element) are provided and the surface (the surface 52A) of the second portion 52 at which the electronic components including the detecting unit 35 (the light-receiving elements) are provided, the plate support members keeping the surfaces (the surfaces 51A and 52A) provided with the electronic components in a plane manner.

Next, various processes for attaching the components to the surface 50A of the substrate 50 are conducted. To be more specific, the components on which wiring connection is performed through soldering are attached to the surface 50A through the following steps: solder printing for mounting the generating unit 41 and a part of the component 61 on the surface 51A of the first portion 51 and for mounting the detecting unit 35 on the surface 52A of the second portion 52 (step S7), mounting of the various components including the generating unit 41 and the detecting unit 35 to the surface 50A (step S8), reflow by heating the surface 50A side after mounting by the processing of step S8 (step S9), appearance inspection of soldering of the surface 50A (step S10), and the like. After that, the substrate is washed (step S11). After washing of the substrate, a paste (for example, an Ag paste) for mounting the bare chip that is a part of the component 61 is applied to the surface 50A (step S12), the bare chip is mounted (step S13), and the bare chip is fixed by heat curing (step S14). Then, the bare chip and the wiring of the substrate 50 are connected by wire bonding (step S15). After wire bonding, a resin (UV curing resin) that is cured by ultraviolet rays is applied to the surface 50A side of the substrate 50 (step S16), a substrate (for example, a glass substrate) for sealing is mounted to the surface 50A side to which the UV curing resin has been applied (step S17), and UV curing processing that is processing of curing the UV curing resin by irradiation of ultraviolet rays is applied (step S18). As described above, the method of manufacturing the sensor 31 (the optical sensor) according to the present embodiment includes the process of providing the generating unit 41 at the first portion 51, and the detecting unit 35 at the second portion 52. Here, in a case where the surface (back surface 50B) of the substrate 50 on the side where the plate member (for example, the support substrate 65) is provided is represented as one surface, the generating unit 41 and the detecting unit 35 are provided on the other surface (the surface 50A) side. Further, one or more electronic components (for example, the detecting unit 35 and the component 61) provided at the surface 52A of the second portion 52 are provided within the range in which the package of the IC circuit 60 exists on the back surface 52B.

The wiring bonding is Au wiring bonding using a gold wire. However, the Au wiring bonding is an example, and the wiring bonding is not limited thereto and can be appropriately changed. Further, tape automated bonding (TAB) may be employed in place of the wire bonding, or the bare chip may be soldered with the wiring of the substrate as a flip chip.

Next, the generating unit 41 and the detecting unit 35 are brought to face each other. To be specific, for example, the substrate 50 is bent at two places such that the surface (the surface 51A) of the first portion 51 at which the generating unit 41 is provided and the surface (the surface 52A) of the second portion 52 at which the detecting unit 35 is provided are provided in a parallel manner to face each other (step S19). As described above, the method of manufacturing the sensor 31 (the optical sensor) according to the present embodiment includes the process of causing the substrate 50 as a flexible substrate (FPC) to become a bent shape in which the surface (the surface 51A) of the first portion 51 at which the generating unit 41 (the light-emitting element) is provided and the surface (the surface 52A) of the second portion 52 at which the detecting unit 35 (the light-receiving elements) is provided face each other.

As an example has been described in the processes of steps S7 to S14, the method of manufacturing the sensor 31 (the optical sensor) according to the present embodiment includes the process of providing the generating unit 41 (the light-emitting element) at the first portion 51, and the detecting unit 35 (the light-receiving elements) at the second portion 52. Note that, desirably, the four light-receiving elements (for example, the first light-receiving unit PD1 to the fourth light-receiving unit PD4) that are included in the detecting unit 35 are arranged at different positions on a predetermined plane (for example, the surface 52A), the distances (the distances W) from the four light-receiving elements to one point on the predetermined plane are equal, and the four line segments that connect the one point and the centers of the light-receiving regions of the four light-receiving elements form right angles with each other. Further, desirably, the straight line L2 as a normal line of the predetermined plane (the surface 52A) that passes through the one point (arrangement center S0) passes through the center of the emission point 41S of the light of the light-emitting element (the generating unit 41) after the substrate 50 is bent. Desirably, the generating unit 41 and the detecting unit 35 are provided in consideration of the aforementioned configurations. To be specific, a first condition that the first line LA as a bending line at the bending position 55a and the second line LB as a bending line at the bending position 55b are made parallel is satisfied. Further, a second condition that the distance (the distance W1) between the first point and the first line LA, and the distance (the distance W2) between the second point and the second line LB are made equal is satisfied. The first point is a generation center point of the object to be detected generated by the generating unit 41 on the plane before the substrate 50 is bent (for example, emission point 41S). The second point is either the center of the detection region of the object to be detected that is detected by the detecting unit 35 or the arrangement center of the plurality of detection regions of the detecting unit (for example, arrangement center S0). Further, a third condition that the first point and the second point are arranged on the same straight line (for example, the straight line L1) perpendicular to the first line LA and the second line LB in the substrate 50 before the substrate 50 is bent is satisfied. Wiring of the generating unit 41 and the detecting unit 35 is provided at the substrate 50 at the time of forming the substrate 50, the first line LA and the second line LB are determined, and arrangement of the generating unit 41 and the detecting unit 35 at the time of mounting is determined, such that the first to third conditions are satisfied.

Next, the housing (for example, the stator 20) is formed (step S20). To be specific, the housing including the first housing (for example, the body 21) and the second housing (for example, the chassis 22) is formed. The first housing operably supports a member (for example, the optical scale 11) that exerts influence on the light by being operated in the region to be detected as a space between the light-emitting element (the generating unit 41) and the light-receiving elements (the detecting unit 35). A part of the substrate 50 is fixed to second housing. In the present embodiment, the cover 23 is further formed as one configuration of the stator 20 as the housing that houses the substrate 50 and the optical scale 11. However, the cover 23 is an example of a specific configuration of the housing, and the configuration of the housing is not limited thereto. For example, the cover 23 may be integrated with the chassis 22. Further, the shaft 12 provided in the body 21 as the first housing may be a shaft having an outer peripheral surface to which the antireflection processing is applied. Further, the antireflection processing may be applied to an inner peripheral surface of the stator 20 in which the substrate 50 and the optical scale 11 are housed.

After that, a process regarding assembly of the sensor 31 is performed (step S21). In the case of the sensor 31, for example, the predetermined plane is used as a reference, and the first portion 51 and the second portion 52 of the bent substrate 50 and the plate surface of the optical scale 11 are made along the predetermined plane. In this state, at least one of the substrate 50 and the stator 20 including the optical scale 11 is moved in the direction along the predetermined plane, so that the optical scale 11 is provided in the region to be detected. To be specific, for example, at the position where the optical scale 11 is provided, of the columnar outer peripheral surface of the stator 20, the opening portion into which the substrate 50 is insertable is provided in the direction along the plate surface of the optical scale 11, and the substrate 50 enters the opening portion, so that the optical scale 11 is provided in the region to be detected. In this case, the substrate 50 enters the opening portion by being inserted from the harness portion 54 side. Further, the semi-arc-shaped first portion 51 enters the side of the optical scale 11, into which the rotor 10 extends, and the circular second portion 52 enters the side of the optical scale 11, into which the rotor 10 does not extend.

To be more specific, for example, as illustrated in FIG. 10, the second portion 52 of the substrate 50 is fixed to the chassis 22. Then, as illustrated in FIG. 14, the chassis 22 to which the second portion 52 is fixed and the body 21 at which the rotor 10 is rotatably provided are arranged to satisfy the positional relation in which the first portion 51, the second portion 52, and the optical scale 11 become substantially parallel, and in which the optical scale 11 is positioned in the region to be detected between the first portion 51 and the second portion 52. That is, the positional relation in which the first portion 51, the second portion 52, and the optical scale 11 are arranged along a predetermined plane is satisfied. In this positional relation, the body 21 and the chassis 22 are brought into proximity to each other and come in contact with each other along the predetermined plane such that the chassis 22 enters the opening portion 21a of the body 21, and the body 21 and the chassis 22 are assembled. Accordingly, the optical scale 11 is provided in the region to be detected. Here, in bringing the body 21 and the chassis 22 into proximity to each other in the positional relation in which the optical scale 11 is positioned in the region to be detected between the first portion 51 and the second portion 52, the support substrate 65 adhering to the back surface 51B of the first portion 51 is desirably not in contact with the adhesive surface 21c of the body 21. Then, in bringing the body 21 and the chassis 22 into contact with each other to assemble the body 21 and the chassis 22, the chassis 22 is pushed up to approach the adhesive surface 21c, and the support substrate 65 and the adhesive surface 21c are brought in contact and adhering to each other. By the assembly method, while one surface of the plate member (the support substrate 65) adheres to the surface (for example, the back surface 51B) of the other (for example, the first portion 51) that is opposite to the other surface of the other facing the region to be detected, the other surface of the plate member (the support substrate 65) adheres to the first housing (for example, the body 21). Various specific design matters such as the length of the connecting portion 53, the extending length of the shaft 12 on the adhesive surface 21c side, and the thickness of the support substrate 65 are desirably set to perform such assembly of the body 21 and the chassis 22. As described above, the method of manufacturing the sensor 31 (the optical sensor) according to the present embodiment includes the process in which one (for example, the second portion 52) of the first portion 51 and the second portion 52 is fixed to the second housing (for example, the chassis 22), and in which the surface (for example, the back surface 51B) of the other (for example, the first portion 51) of the first portion 51 and the second portion 52 that is opposite to the other surface of the other facing the region to be detected is caused to adhere to the first housing (for example, the body 21).

After assembly of the body 21 and the chassis 22, the harness portion 54 extends through the notch 21b provided in the body 21 on the opposite side of the opening portion 21a. After that, in a case where the cover 23 is a separate body from the chassis 22, the cover 23 is attached to cover the opening portion 21a of the body 21. Note that, in FIGS. 13 and 14, illustration of a part of the circuits such as the detecting unit 35 is omitted. However, in reality, the various circuits including the detecting unit 35 have already been mounted.

As described above, according to the present embodiment, the first portion 51 provided with the generating unit 41 and the second portion 52 provided with the detecting unit 35 are not separated. Therefore, the positioning of the generating unit 41 and the detecting unit 35 can be performed by the simple work such as bending or curving the substrate 50. As described above, according to the present embodiment, the positioning of the generating unit 41 and the detecting unit 35 becomes easier.

Further, the first portion 51 and the second portion 52 are provided to become parallel, so that the positional relation between the generating unit 41 provided at the first portion 51 and the detecting unit 35 provided at the second portion 52 can be adjusted on the basis of the relation between the first portion 51 and the second portion 52 provided in a parallel manner. Therefore, position adjustment for housing the detecting unit 35 within a generation region of the object to be detected generated by the generating unit 41 in a case where the generating unit 41 has directivity, and design regarding a position angle when the generating unit 41 and the detecting unit 35 are provided at the substrate 50 become easier.

Further, the space between the first portion 51 and the second portion 52 can be provided by the connecting portion 53. Therefore, the region to be detected between the generating unit 41 and the detecting unit 35 can be more easily provided.

Further, the connecting portion 53 includes the wiring connected to the generating unit 41, so that the wiring connected to the generating unit 41 and the connecting portion 53 can be integrated. Therefore, the substrate 50 including the connecting portion 53 and the wiring can be made more compact.

Further, the width of the connecting portion 53 is smaller than the first portion 51 and the second portion 52, so that the area of the substrate 50 can be made smaller than a case where the width of the substrate 50 including the first portion 51 and the second portion 52 across the connecting portion 53 is made uniform. Therefore, the weight of the substrate 50 can be further reduced.

Further, the substrate 50 is bent at two places, so that the region to be detected can be provided between the generating unit 41 and the detecting unit 35 by the bending of the substrate 50. Further, the bent places can be made clear.

Further, the first portion 51 is smaller than the second portion 52, so that the weight of the first portion 51 can be made lighter. Therefore, requirements such as strength required for the connecting portion 53 can be made simpler.

Further, the substrate 50 is bent into the shape where the generating unit 41 and the detecting unit 35 face each other (for example, in a C-shaped manner), so that handling of a case where the sensor is provided in the housing becomes easier, such as a part (for example, the second portion 52) of the substrate 50 being able to be made along a plane (for example, a planar portion of the chassis 22) in the stator 20.

Further, since the substrate 50 is a flexible substrate, the series of work of processing the substrate 50 for providing the region to be detected between the generating unit 41 and the detecting unit 35 after mounting the components including the generating unit 41 and the detecting unit 35 on the substrate 50 in the state where the first portion 51 and the second portion 52 exist on the same plane can be more easily performed.

Further, the substrate 50 is provided with the harness portion 54 including the wiring connected to the generating unit 41 and the detecting unit 35, so that the wiring to be connected to the configuration of the sensor 31 including the generating unit 41 and the detecting unit 35 can be collectively provided at the substrate 50. That is, the substrate 50 is provided with the harness portion 54, so that it is not necessary to individually pull out wiring from a component (a circuit or the like) that requires wiring. Therefore, it is not necessary to individually handle the substrate 50 and the wiring, and the sensor can be more easily handled.

Further, the detecting unit 35 detects change in the object to be detected caused by change in the physical quantity in the region to be detected, so that an object that causes change in the physical quantity can be employed as an object to be sensed by the sensor 31.

Further, the object to be detected is the electromagnetic waves (for example, the light emitted by the generating unit 41 serving as a light-emitting element), so that the change in the region to be detected can be detected according to change in the electromagnetic waves.

Further, the change in the physical quantity is due to rotation of the rotary body (for example, the optical scale 11) existing in the region to be detected, so that rotary motion of the rotary body can be employed as an object to be sensed by the sensor 31.

Further, one (for example, the second portion 52) of the first portion 51 and the second portion 52 is fixed to the second housing (for example, the chassis 22), and the surface of the other (for example, the first portion 51) that is opposite to the other surface of the other facing the region to be detected adheres to the first housing (for example, the body 21). That is, in the assembly of the sensor 31, the one may just be fixed to the second housing, and the surface of the other that is opposite to the other surface of the other facing the region to be detected may just adhere to the first housing. Therefore, the assembly of the sensor 31 becomes easier.

Further, the surface of the other that is opposite to the other surface of the other facing the region to be detected and the first housing can adhere by simply providing the plate member (for example, the support substrate 65) having adhesion on both sides. Therefore, the assembly of the sensor 31 becomes easier.

Further, the plate member (for example, the support substrate 65) is affixed to the surface of the other that is opposite to the other surface of the other facing the region to be detected before the assembly of the housing (for example, the stator 20), so that the surface of the other and the first housing can adhere in a state where the plate member and the substrate 50 are integrated. Therefore, the assembly of the sensor 31 becomes easier.

Further, the four light-receiving elements are arranged at the different positions on a predetermined plane (for example, the surface 52A), the distances (distances W) from the four light-receiving elements to the one point (arrangement center S0) on the predetermined plane are equal, the four line segments connecting the one point and the centers of the light-receiving regions of the four light-receiving elements form angles (θ1 to θ4) with each other, and the normal line (for example, the straight line L2) of the predetermined plane that passes through the one point passes through the emission point 41S of the light of the light-emitting element (generating unit 41). Therefore, the distances of the four light-receiving elements to the light-emitting element can be made equal. Therefore, variation in the outputs associated with detection of the light by the light-receiving elements can be decreased. As described above, according to the present embodiment, the outputs of the light-receiving elements can be further stabilized.

Further, the support members are attached to the back-side surfaces (the back surfaces 51B and 52B) of the FPC and keep the surfaces (for example, the surfaces 51A and 52A) on the opposite side of the back-side surfaces in a plane manner. Therefore, stress to the connecting portion that connects the electronic component provided at the FPC and the FPC can be decreased. Therefore, failure of the connecting portion between the FPC and the electronic components provided at the FPC can be decreased. Therefore, reliability of the sensor 31 regarding normal operation can be further enhanced.

Further, the package of the integrated circuit (for example, the IC circuit 60) provided at the back-side surface (for example, back surface 52B) can be used as the support member of the electronic components provided at the surface (for example, the surface 52A) on the opposite side of the back-side surface. Further, the integrated circuit is also one of the circuits that are included in the sensor 31, and thus the substrate area can be used more efficiently by providing the circuits on both surfaces of the FPC. Therefore, the area of the FPC with respect to a scale of the necessary circuits can be easily decreased. Therefore, downsizing of the sensor 31 by highly integrated circuits can be more easily achieved.

Further, the plate member, such as the support substrate 65, having insulation properties and formed to fit the shape of the first portion 51 is provided, so that the surface (for example, the surface 51A) at which the electronic components are provided can be thoroughly supported by the support member.

Further, the surface (for example, the surface 51A) at which the generating unit 41 of the first portion 51 is provided and the surface (for example, the surface 52A) at which the detecting unit 35 of the second portion 52 is provided are provided to be parallel and face each other, the first line LA and the second line LB are parallel, the distance W1 between the first point (for example, the emission point 41S) and the first line LA and the distance W2 between the second point (for example, the arrangement center S0) and the second line LB are equal, and the first point and the second point exist on the same straight line (for example, the straight line L1) perpendicular to the first line and the second line in the substrate 50 before the substrate 50 is bent, so that the first point and the second point exist on the same straight line (for example, the straight line L2) perpendicular to the first portion 51 and the second portion 52 before the substrate 50 is bent. Therefore, the generating unit 41 and the detecting unit 35 can be brought to highly accurately face each other, and thus the output of the detecting unit 35 can be further stabilized.

Further, the antireflection processing is applied to the surface (surface 50A) of the substrate 50 at which the light-emitting element (generating unit 41) and the light-receiving elements (detecting unit 35) are provided, so that reflection of light off the substrate 50 that emitted from the generating unit 41 can be decreased. Therefore, the output of the detecting unit 35 due to detection of the reflection light can be decreased, and thus the output of the detecting unit 35 can be further stabilized.

Further, the antireflection processing is applied to the shaft 12, so that reflection of light off the shaft 12 that emitted from the generating unit 41 can be decreased. Therefore, the output of the detecting unit 35 due to detection of the reflection light can be decreased, and thus the output of the detecting unit 35 can be further stabilized.

Further, the sensor 31 functions as a rotary encoder, so that an angular position such as a rotary angle of a rotary moving body connected to the sensor 31 can be detected.

Figure 27:
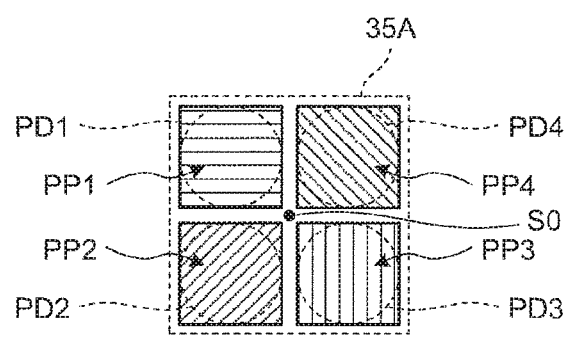
FIG. 27 is a diagram illustrating another arrangement example of a plurality of light-receiving elements included in the detecting unit.

FIG. 27 is a diagram illustrating another arrangement example of the plurality of light-receiving elements included in the detecting unit 35. As illustrated in FIG. 27, in the detecting unit 35, the light-receiving elements (the first light-receiving unit PD1 to the fourth light-receiving unit PD4) having square polarizing layers PP1 to PP4 may be arranged in four corners of a square arrangement region 35A around the arrangement center S0. In this case, the four light-receiving elements are arranged at equal distances to the arrangement center S0, and four line segments that connect the arrangement center S0 and the centers of light-receiving regions of the four light-receiving elements can form right angles with each other. The distances between the arrangement center S0 and the four light-receiving elements are arbitrary. However, by making the distances as short as possible, the four light-receiving elements can detect the light in a state where attenuation of the light source light 71 of the light-emitting element (the generating unit 41) is small. Further, the four light-receiving elements may be individually provided at the second portion 52, or the detecting unit 35 as a package in which the positional relation between the four light-receiving elements and the arrangement center S0 is fixed in advance may be provided at the second portion 52. By employing the package, arrangement of the four light-receiving elements becomes easier.

Further, the first portion 51 and the second portion 52 may not be parallel. The relation between the first portion 51 and the second portion 52 is any relation in which the region to be detected can be provided between the generating unit 41 and the detecting unit 35, and in which the object to be detected generated by the generating unit 41 provided at the first portion 51 can be detected by the detecting unit 35 provided at the second portion 52. Therefore, the detailed arrangement of the first portion 51 and the second portion 52 can be appropriately changed.

The connecting portion 53 may not be provided with wiring. In this case, the connecting portion 53 supports one of the first portion 51 and the second portion 52, the one not being supported by the chassis 22, for example. Further, it is not essential that the one is larger than the other. The first portion 51 and the second portion 52 may have the same size, or the one supported by the connecting portion 53 may be larger than the other. Further, the stator 20 or the like may include a support portion for supporting at least one of the connecting portion 53 and the first portion 51 in the present embodiment. Further, the support portion may be provided with a configuration (for example, a locking portion such as an adhesive, a tape, or a protrusion) for fixing at least one of the connecting portion 53 and the first portion 51 in the present embodiment.

The bending position of the substrate 50 is not limited to the connecting portion 53. Further, bending of the substrate 50 is not essential. For example, the substrate 50 may be curved in a U-shape manner such that the generating unit 41 and the detecting unit 35 are brought to face each other.

The substrate 50 is not to the flexible substrate. The substrate 50 in the present invention can be any substrate in which the region to be detected can be provided between the generating unit 41 and the detecting unit 35, in which the detecting unit 35 provided at the second portion 52 can detect the object to be detected generated by the generating unit 41 provided at the first portion 51, and in which the first portion 51 and the second portion 52 are integrated. For example, a substrate configured from a material that can be bent or curved by processing such as heating may be employed, the processing may be applied to a portion (for example, the connecting portion or the like) between the first portion and the second portion to make the portion bent or curved, and the first portion and the second portion may be brought to face each other. Further, a substrate having both of a portion that is less easily deformed and a portion that is easily deformed, like a rigid flexible substrate, may be employed. In this case, the portion that is less easily deformed is used for the first portion and the second portion, and the portion that is easily deformed is used for a portion (for example, the connecting portion or the like) between the first portion and the second portion, so that the first portion and the second portion can be brought to face each other.

The harness portion 54 may be appropriately omitted. Further, two or more extending portions function as the harness portion may be employed.

The specific pattern of the signal track T1 of the optical scale 11 and the pattern of the polarizing layers PP1 to PP4 provided in the detecting unit 35 can be appropriately changed. The patterns are determined in consideration of a relation between a pattern of a configuration (for example, the optical scale 11) that is provided in the region to be detected and causes polarization and a pattern of a configuration (for example, a polarizing layer) that allows the light to pass in detection.

The configuration provided in the region to be detected is not limited to the optical scale 11 that causes the polarization. For example, a plate member provided with a hole that allows the light to selectively pass through or a transmission portion that selectively transmits the light according to the rotary angle of the rotor 10 may be provided in place of the optical scale 11. In this case, change in the rotary angle of the rotor 10 appears as change of the position where or timing when the light is detected by the detecting unit. The detecting unit may not include the polarizing layers PP1 to PP4. When a signal that indicates the position where the light is detected is output from the sensor, the angular position of the rotary machine connected to the shaft 12 can be detected. Further, in this case, the detecting unit 35 does not need to include the four light-receiving elements. For example, the detecting unit 35 may include one light-receiving element, or may include a plurality of light-receiving elements. In a case where the number of light-receiving elements is one, the distance W2 and the distance W1 are desirably made equal, where the above-described distance W2 is regarded as the distance between the center of a detection region of the object to be detected (the center of a light-receiving region) that is detected by the one light-receiving element and the second line LB. Further, in a case where the number of light-receiving elements is more than one, the distance W2 and the distance W1 are desirably made equal, where the above-described distance W2 is regarded as the distance between an arrangement center of a plurality of detection regions of the detecting unit configured from the plurality of light-receiving elements and the second line LB.

The light-emitting element included in the generating unit 41 that emits light is not limited to a point light source like the light-emitting diode. For example, the light-emitting element may be a surface light source like organic electroluminescence (EL) illumination. In a case where the light-emitting element is the surface light source, a straight line that passes through the center of an emission surface of the light of the light-emitting element, and goes along a direction in which the light-emitting element and the light-receiving elements face each other can be defined, where the center of a generation region of the light in the surface light source is a point corresponding to the emission point 41S of the light in the above-described embodiment. Arrangement of the four light-receiving elements can be determined similarly to the above-described embodiment, considering the straight line defined as described above as a straight line equivalent to the straight line L2 illustrated in FIG. 12. That is, the arrangement of the four light-receiving elements can be determined such that the four light-receiving elements are arranged at equal distances to the straight line and at different positions on a predetermined plane perpendicular to the straight line, and four line segments that connect an intersection point of the straight line and the predetermined plane and the centers of light-receiving regions of the four light-receiving elements form right angles with each other. Further, the center of the emission surface 41T may be employed as a point in place of the emission point 41S of the light.

Further, in the above-described embodiment, the respective components (the IC circuit 60 and the support substrate 65) that functions as the support members that keep the surfaces (the surfaces 51A and 52A) at which the electronic components are provided in a plane manner are attached to both of the first portion 51 and the second portion 52. However, the support members may not necessarily be provided at both of the first portion 51 and the second portion 52. Appropriate change can be made according to the arrangement of the components provided at the FPC used as the substrate of the present invention, and the support member may be provided at one of the first portion 51 and the second portion 52. Further, the support member may be provided at the connecting portion 53 or the like.

Further, the electromagnetic wave as the object to be detected is not limited to the light from the light-emitting diode or laser light. The electromagnetic wave as the object to be detected may be an invisible ray such as an infrared ray, an ultraviolet ray, an X ray, or the like. Further, the object to be detected may be magnetic force. In this case, the generating unit generates a magnetic field by the magnetic force. The detecting unit performs sensing by detecting change in magnetic force caused by the change in the physical quantity in the region to be detected (for example, passage of an object). When the object to be detected is the magnetic force, the change in the region to be detected can be detected by the change in the magnetic force. Further, the object to be detected may be a sound wave including a ultrasonic wave, an ion such as plasma, a cathode ray (electron beam), or the like, other than the electromagnetic wave or the magnetic force. The object to be detected may be any object as long as change is caused by change in the physical quantity of a configuration provided in the region to be detected.

The change in the physical quantity may be linear motion by a linearly moving body. In this case, the linear motion of the linearly moving body can be employed as an object to be sensed. Further, the sensor can function as a linear encoder. To be specific, the sensor that functions as a linear encoder by detecting, by the detecting unit, change in the object to be detected caused by a configuration (for example, a scale) that linearly moves in the region to be detected relative to the first portion 51 and the second portion 52, performs sensing regarding linear motion of the configuration. Therefore, existence/non-existence of motion and a motion position of the linearly moving body connected to the encoder can be detected according to an aspect of the present invention.

The invention claimed is:
1. A sensor comprising:
 a generating unit that generates a predetermined object to be detected;
 a detecting unit that detects the object to be detected generated by the generating unit;
 a substrate at which the generating unit and the detecting unit are provided;
 a member that exerts influence on the object to be detected by being operated in a region to be detected that is a space between the generating unit and the detecting unit; and
 a cylindrical housing that houses the generating unit and the detecting unit provided at the substrate and the member, wherein
 the housing includes a first housing that operably supports the member and a second housing to which a part of the substrate is fixed,
 the substrate includes a first portion provided with the generating unit and a second portion provided with the detecting unit, the first portion and the second portion being integrated, and the substrate has a curved shape or a bent shape in which a surface of the first portion at which the generating unit is provided and a surface of the second portion at which the detecting unit is provided face each other,
 one of the first portion and the second portion is fixed to the second housing,
 a surface of the other of the first portion and the second portion adheres to the first housing, the surface of the other being opposite to another surface of the other facing the region to be detected,
 the second housing includes two support portions facing each other across the one of the first portion and the second portion, and
 the two support portions each include: an arc-shaped inner peripheral portion that is in contact with a circular outer periphery of the one of the first portion and the second portion; and an arc-shaped outer peripheral portion that is along a cylindrical inner peripheral surface of the first housing.

2. The sensor according to claim 1, wherein
 the surface of the other that is opposite to the other surface of the other facing the region to be detected adheres to the first housing through a plate member.

3. The sensor according to claim 2, wherein
 one surface of the plate member adheres to the surface of the other that is opposite to the other surface of the other facing the region to be detected, and the other surface of the plate member adheres to the first housing.

4. The sensor according to claim 1, wherein
 the surface of the other that is opposite to the other surface of the other facing the region to be detected adheres to the first housing by an adhesive.

5. The sensor according to claim 1, wherein
 the sensor is a rotary encoder,
 the substrate further includes:
  a connecting portion that connects the first portion and the second portion; and
  a harness portion including wiring connected to the generating unit and the detecting unit,
 from a first end of the substrate to a second end of the substrate, the other of the first portion and the second portion, the connecting portion, the one of the first portion and the second portion, and the harness portion are sequentially arranged and integrated, and
 the substrate is bent at a first bending position corresponding to a boundary between the first portion and the connecting portion and at a second bending position corresponding to a boundary between the second portion and the connecting portion to have a C shape such that the generating unit and detecting unit face each other.

6. A method of manufacturing a sensor including a generating unit that generates a predetermined object to be detected, a detecting unit that detects the object to be detected generated by the generating unit, a substrate at which the generating unit and the detecting unit are provided, a member that exerts influence on the object to be detected by being operated in a region to be detected that is a space between the generating unit and the detecting unit, and a cylindrical housing that houses the generating unit and the detecting unit provided at the substrate and the member, the method comprising:
 forming the substrate that includes a first portion provided with the generating unit and a second portion provided with the detecting unit, the first portion and the second portion being integrated;
 causing one surface of a plate member to adhere to the first portion on one surface of the substrate;

providing the generating unit at the first portion on the other surface of the substrate, and providing the detecting unit at the second portion on the other surface of the substrate;

causing a shape of the substrate to become a curved shape or a bent shape in which the surface of the first portion at which the generating unit is provided and the surface of the second portion at which the detecting unit is provided face each other;

forming the housing including a first housing that operably supports the member and a second housing to which a part of the substrate serving as the second portion is fixed;

forming two support portions on the second portion such that the two support portions face each other across the second portion;

causing a shape of each of the two support portions to have: an arc-shaped inner peripheral portion that is in contact with a circular outer periphery of the first portion; and an arc-shaped outer peripheral portion that is along a cylindrical inner peripheral surface of the first housing;

fixing the second portion to the second housing; and causing the other surface of the plate member to adhere to the first housing.

* * * * *